United States Patent
Bhushan et al.

(10) Patent No.: US 8,811,198 B2
(45) Date of Patent: Aug. 19, 2014

(54) PILOT REPORT BASED ON INTERFERENCE INDICATIONS IN WIRELESS COMMUNICATION SYSTEMS

(75) Inventors: Naga Bhushan, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1095 days.

(21) Appl. No.: 12/256,234

(22) Filed: Oct. 22, 2008

(65) Prior Publication Data

US 2009/0109939 A1 Apr. 30, 2009

Related U.S. Application Data

(60) Provisional application No. 60/982,282, filed on Oct. 24, 2007.

(51) Int. Cl.

| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 4/00 | (2009.01) |
| H03D 1/04 | (2006.01) |
| H03D 1/06 | (2006.01) |
| H03K 5/01 | (2006.01) |
| H04B 1/10 | (2006.01) |
| H04W 40/00 | (2009.01) |
| H04B 15/00 | (2006.01) |
| H04B 1/00 | (2006.01) |
| H04B 1/04 | (2006.01) |
| H04W 72/08 | (2009.01) |
| H04W 84/04 | (2009.01) |
| H04W 72/04 | (2009.01) |
| H04W 88/04 | (2009.01) |
| H04W 52/40 | (2009.01) |
| H04W 52/14 | (2009.01) |

(52) U.S. Cl.
CPC .......... *H04W 72/082* (2013.01); *H04W 84/045* (2013.01); *H04W 72/0406* (2013.01); *H04W 88/04* (2013.01); *H04W 52/40* (2013.01); *H04W 52/146* (2013.01)
USPC ........... 370/252; 370/328; 375/346; 455/446; 455/501; 455/63.1; 455/114.2

(58) Field of Classification Search
USPC ........... 370/252, 328; 375/346; 455/446, 501, 455/67.3
See application file for complete search history.

(56) References Cited

U.S. PATENT DOCUMENTS

| | | | |
|---|---|---|---|
| 5,822,693 A | 10/1998 | Harrison | |
| 7,613,444 B2 * | 11/2009 | Lindqvist et al. | ............. 455/403 |

(Continued)

FOREIGN PATENT DOCUMENTS

EP  0802692 A2  10/1997

OTHER PUBLICATIONS

International Search Report and The Written Opinion—PCT/US2008/081028, International Search Authority—European Patent Office—Mar. 16, 2009.

(Continued)

*Primary Examiner* — Alpus H Hsu
*Assistant Examiner* — Yee Lam
(74) *Attorney, Agent, or Firm* — Charles E. Eggers

(57) ABSTRACT

Systems and methodologies are described that facilitate employing interference-overload indications to generate pilot strength reports that can be leveraged to mitigate reverse link interference. An affected base station can send interference-overload indications when experiencing a strong interference/jamming scenario due to reverse link transmission by an offending access terminal. The offending access terminal can monitor interference-overload indications from the affected base station (e.g., although the affected base station can be excluded from an active set of the offending access terminal) and send a pilot strength report to a serving base station in response. The serving base station can receive the interference induced pilot strength report and command the offending access terminal not to transmit on certain channel resources (e.g., time, frequency, spatial, . . . ); thus, the affected base station can use these resources to schedule transmission(s) by access terminal(s) served thereby.

65 Claims, 11 Drawing Sheets

(56) References Cited

U.S. PATENT DOCUMENTS

| | | | |
|---|---|---|---|
| 7,620,370 B2 * | 11/2009 | Barak et al. | 455/67.13 |
| 2003/0026215 A1 * | 2/2003 | Schafer | 370/280 |
| 2004/0203336 A1 * | 10/2004 | Sinnarajah et al. | 455/3.01 |
| 2005/0192042 A1 | 9/2005 | Au et al. | |
| 2006/0209721 A1 | 9/2006 | Mese et al. | |
| 2006/0285503 A1 | 12/2006 | Mese et al. | |
| 2007/0004423 A1 * | 1/2007 | Gerlach et al. | 455/452.2 |
| 2007/0105561 A1 * | 5/2007 | Doetsch et al. | 455/450 |
| 2007/0155395 A1 * | 7/2007 | Gopalakrishnan et al. | 455/453 |
| 2007/0258417 A1 * | 11/2007 | Harvey et al. | 370/338 |
| 2007/0298709 A1 * | 12/2007 | Sinnarajah et al. | 455/3.05 |
| 2008/0039131 A1 * | 2/2008 | Kaminski et al. | 455/522 |
| 2008/0049672 A1 * | 2/2008 | Barak et al. | 370/330 |
| 2008/0081564 A1 * | 4/2008 | Rao | 455/63.1 |
| 2008/0090575 A1 * | 4/2008 | Barak et al. | 455/444 |
| 2008/0274745 A1 * | 11/2008 | Barak et al. | 455/447 |
| 2009/0104912 A1 * | 4/2009 | Foster et al. | 455/446 |
| 2012/0093028 A9 * | 4/2012 | Mese et al. | 370/254 |

OTHER PUBLICATIONS

EE624 Mobile Communications Systems (MCS) in: Fundamentals of Cellular Communications, Communication Networks Research Lab, (Fall 2000).

Taiwan Search Report—TW097141033—TIPO—Aug. 3, 2012.

\* cited by examiner

PILOT REPORT BASED ON INTERFERENCE INDICATIONS IN WIRELESS COMMUNICATION SYSTEMS

CROSS-REFERENCE TO RELATED APPLICATIONS

This application claims the benefit of U.S. Provisional Patent Application Ser. No. 60/982,282 entitled "PILOT REPORT BASED ON INTERFERENCE INDICATIONS IN WIRELESS COMMUNICATION SYSTEMS" which was filed Oct. 24, 2007. The entirety of the aforementioned application is herein incorporated by reference.

BACKGROUND

I. Field

The following description relates generally to wireless communications, and more particularly to employing interference-overload indications to yield pilot strength reports that can be leveraged to mitigate reverse link interference experienced at base station(s) in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

An access terminal can utilize a channel in which base stations of different power levels operate. For instance, the access terminal can be served by a particular base station, while one or more other base stations can be positioned in vicinity of the access terminal. The one or more other base stations can include a femto cell base station that can transmit over a forward link at a much lower power than disparate base stations (e.g., macro cell base stations, . . . ); due to the lower forward link transmit power, the access terminal can be unaware of the presence of the femto cell base station. Additionally or alternatively, the one or more other base stations can include a base station that is part of a private enterprise, which denies access to access terminals not belonging to a private group.

According to an example, an access terminal can communicate with its serving base station while in vicinity of pico cell base station(s) (e.g., cellular base station(s) that each cover a relatively small area such as in-building or in-aircraft) or femto cell base station(s) (e.g., cellular base station(s) that each cover a relatively small area such as in a residential or small business environment) and/or base station(s) that deny access to the access terminal. For instance, the access terminal can be unaware of a pico or femto cell base station due to low forward link transmit power employed thereby. Whether operating in vicinity of pico/femto cell base station(s) and/or base station(s) that deny access, the access terminal can cause significant interference to these other base stations since the access terminal can be closely positioned to the other base stations. Further, when employing conventional techniques, interference resultant from reverse link transmission by the access terminal can commonly be uncontrolled when the pico/femto cell base station(s) and/or base station(s) denying access are excluded from an active set of the access terminal. In these situations, such uncontrolled reverse link interference can degrade overall system performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating employment of interference-overload indications to generate pilot strength reports that can be leveraged to mitigate reverse link interference. An affected base station can send interference-overload indications when experiencing a strong interference/jamming scenario due to reverse link transmission by an offending access terminal. The offending access terminal can monitor the interference-overload indications from the affected base station (e.g., although the affected base station may be excluded from an active set of the offending access terminal). By processing these indications over time, the offending access terminal can conclude that the affected base station sending these interference-overload indications is experiencing persistent and severe (or unacceptable) interference overload. Alternatively, the affected base station can explicitly indicate a condition of persistent and severe interference overload. For example, the affected base station can explicitly indicate such a condition on a dedicated interference control channel, using a bit that is embedded in a synchronization/preamble signal or a broadcast message (e.g., monitored periodically by access terminals in geographic proximity of the affected base station), employing a bit that modulates or scrambles the synchronization/preamble signal or broadcast message (e.g., monitored periodically by access terminals in geographic proximity of the affected base station), and so forth. Upon detecting a condition of persistent and severe overload at a non-serving base-station (e.g., an affected base station), the offending access terminal can send a special pilot strength report to a serving base station. Upon receiving the special pilot strength report from the offending access terminal, and serving base station can command the offending access terminal not to transmit on certain channel resources (e.g., time, frequency, spatial, . . . ); thus, the affected base station can use these resources to schedule transmission(s) by access terminal(s) served thereby.

According to related aspects, a method that facilitates mitigating reverse link interference in a wireless communication environment is described herein. The method can include monitoring reverse link interference at an affected base station caused by an access terminal served by a disparate base station. Further, the method can comprise transmitting interference-overload indications as a function of the monitored reverse link interference to the access terminal served by the disparate base station triggering the access terminal to report an overload condition to the disparate base station to cause the disparate base station to inhibit use of a reserved subset of resources for transmission by the access terminal in order to mitigate interference to the affected base station. Moreover, the method can include scheduling at least one disparate access terminal served by the affected base station to transmit utilizing the reserved subset of resources.

Another aspect relates to a wireless communications apparatus. The wireless communications apparatus can include a memory that retains instructions related to evaluating a pilot strength report sent from a first access terminal in response to interference-overload indications obtained by the first access terminal from an affected base station. Moreover, the memory can retain instructions related to restricting the first access terminal from utilizing a reserved subset of resources for reverse link transmission when the first access terminal is determined from the evaluation of the pilot strength report to interfere with the affected base station above a threshold level. Still yet, the memory can retain instructions related to scheduling a second, non-interfering access terminal to employ the reserved subset of resources for reverse link transmission. Further, the wireless communications apparatus can include a processor, coupled to the memory, configured to execute the instructions retained in the memory.

Yet another aspect relates to a wireless communications apparatus that enables mitigating reverse link interference in a wireless communication environment. The wireless communications apparatus can include means for monitoring reverse link interference caused by an access terminal served by a disparate base station. Further, the wireless communications apparatus can comprise means for sending interference-overload indications as a function of the monitored reverse link interference to the disparate base station instigating the access terminal to report an overload condition to the disparate base station to cause the disparate base station to inhibit use of a reserved subset of resources for transmission by the access terminal. Moreover, the wireless communications apparatus can include means for scheduling at least one disparate, served access terminal to transmit utilizing the reserved subset of resources.

Still another aspect relates to a computer program product that can comprise a computer-readable medium. The computer-readable medium can include code for evaluating a pilot strength report sent from a first access terminal in response to interference-overload indications obtained by the first access terminal from an affected base station. Moreover, the computer-readable medium can include code for restricting the first access terminal from utilizing a reserved subset of resources for reverse link transmission when the first access terminal is determined from the evaluation of the pilot strength report to interfere with the affected base station above a threshold level. Further, the computer-readable medium can include code for scheduling a second, non-interfering access terminal to employ the reserved subset of resources for reverse link transmission.

In accordance with another aspect, an apparatus in a wireless communication system can include a processor, wherein the processor can be configured to monitor reverse link interference at an affected base station caused by an access terminal served by a disparate base station. Moreover, the processor can be configured to transmit interference-overload indications as a function of the monitored reverse link interference to the access terminal served by the disparate base station triggering the access terminal to report an overload condition to the disparate base station to cause the disparate base station to inhibit use of a reserved subset of resources for transmission by the access terminal in order to mitigate interference to the affected base station. Further, the processor can be configured to schedule at least one disparate access terminal served by the affected base station to transmit utilizing the reserved subset of resources.

According to other aspects, a method that facilitates yielding a report in response to interference indications in a wireless communication environment is described herein. The method can include determining an interference-overload level associated with an affected base station based upon received interference-overload indications. Further, the method can comprise transmitting a report to a serving base station based upon a function of the interference-overload level.

Yet another aspect relates to a wireless communications apparatus that can include a memory that retains instructions related to determining an interference-overload level associated with an affected base station based upon received interference-overload indications. Moreover, the memory can retain instructions related to transmitting a pilot strength report to a serving base station based upon a function of the interference-overload level. Further, the wireless communications apparatus can comprise a processor, coupled to the memory, configured to execute the instructions retained in the memory.

Another aspect relates to a wireless communications apparatus that enables sending interference induced pilot strength reports in a wireless communication environment. The wireless communications apparatus can include means for determining an interference-overload level associated with an affected base station as a function of received interference-overload indications. Moreover, the wireless communications apparatus can include means for sending a pilot strength report to a severing base station based upon a function of the interference-overload level.

Still another aspect relates to a computer program product that can comprise a computer-readable medium. The computer-readable medium can include code for determining an interference-overload level associated with an affected base station based upon received interference-overload indications. Moreover, the computer-readable medium can comprise code for transmitting a pilot strength report to a serving base station based upon a function of the interference-overload level.

In accordance with another aspect, an apparatus in a wireless communication system can include a processor, wherein the processor can be configured to determine an interference-overload level associated with an affected base station based upon received interference-overload indications. Further, the processor can be configured to transmit a pilot strength report to a serving base station based upon a function of the interference-overload level.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
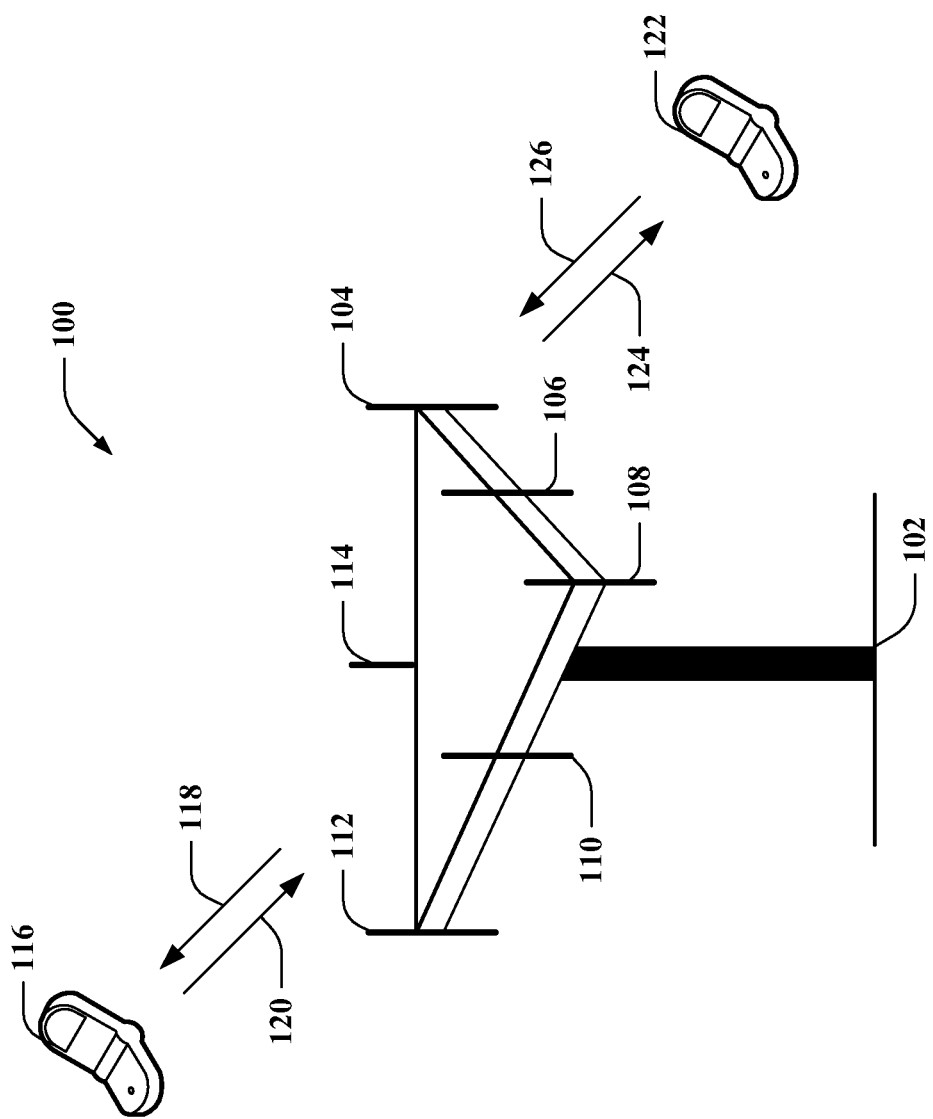
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 enables employing interference-overload indications to manage interference caused by access terminals 116 and 122. According to an example, access terminals 116 and 122 can be served by base station 102. Access terminals 116 and 122 can also respectively monitor interference-overload indications sent from other base station(s) (not shown) (e.g., base stations not included in respective active sets of access terminals 116 and 122, femto cell base stations, . . . ) even though forward link signal strength(s) from such other base station(s) may not be strong enough to invoke generation of pilot strength report(s) as set forth in conventional systems. Rather, in connection with system 100, an access terminal (e.g., access terminal 116, access terminal 122, . . . ) can generate and/or send a special pilot strength report for a base station not in an active set of the access terminal irrespective of pilot strength if interference-overload indications from such base station indicate a strong jamming scenario. Further, the access terminal can transmit the special pilot strength report to base station 102. Upon receiving such interference induced special pilot strength report from the access terminal, base station 102 can inhibit the access terminal from transmitting on certain channel resources (e.g., time, frequency, spatial, . . . ). Thus, affected base station(s) can utilize these interference-free resources to serve its own access terminal(s) (not shown).

While access terminals 116 and 122 can be unable to acquire and/or decode pilot signals, synchronization signals, or the like (e.g., signals employed for establishing a connection with a base station, . . . ) transmitted by a lower power, affected base station (e.g., femto cell base station, . . . ), access terminals 116 and 122 can receive an interference-overload indication transmitted by this lower power, affected base station. For instance, channel(s) utilized for sending interference-overload indications can have higher penetration in comparison to channels utilized for establishing a connection with the affected base station. Accordingly, if an offending access terminal (e.g., access terminal 116, access terminal 122, . . . ) observes high levels of consistent interference-overload indications from the affected base station, then the offending access terminal can report this condition to its serving base station (e.g., base station 102, . . . ), even if other signals from the affected base station may fail to be acquired by the offending access terminal. The serving base station can thereafter schedule transmissions from the offending access terminal on certain resources so that the affected base station can schedule its users on those resources that are not being used by the offending access terminal.

Similarly, an offending access terminal (e.g., access terminal 116, access terminal 122, . . . ) can be unable to connect with an affected base station that operates as part of a private network. Under such a scenario, the affected base station can deny access to the offending access terminal; hence, the affected base station can be excluded from an active set of the offending access terminal. Thus, the offending access terminal can monitor interference-overload indications sent by the affected base station, and based thereupon, the offending access terminal can transmit a special pilot strength report to its serving base station. The serving base station can utilize the special pilot strength report to schedule transmissions from the offending access terminal on certain resources so that the affected base station can schedule its users on those resources that are not being utilized by the offending access terminal.

Figure 2:
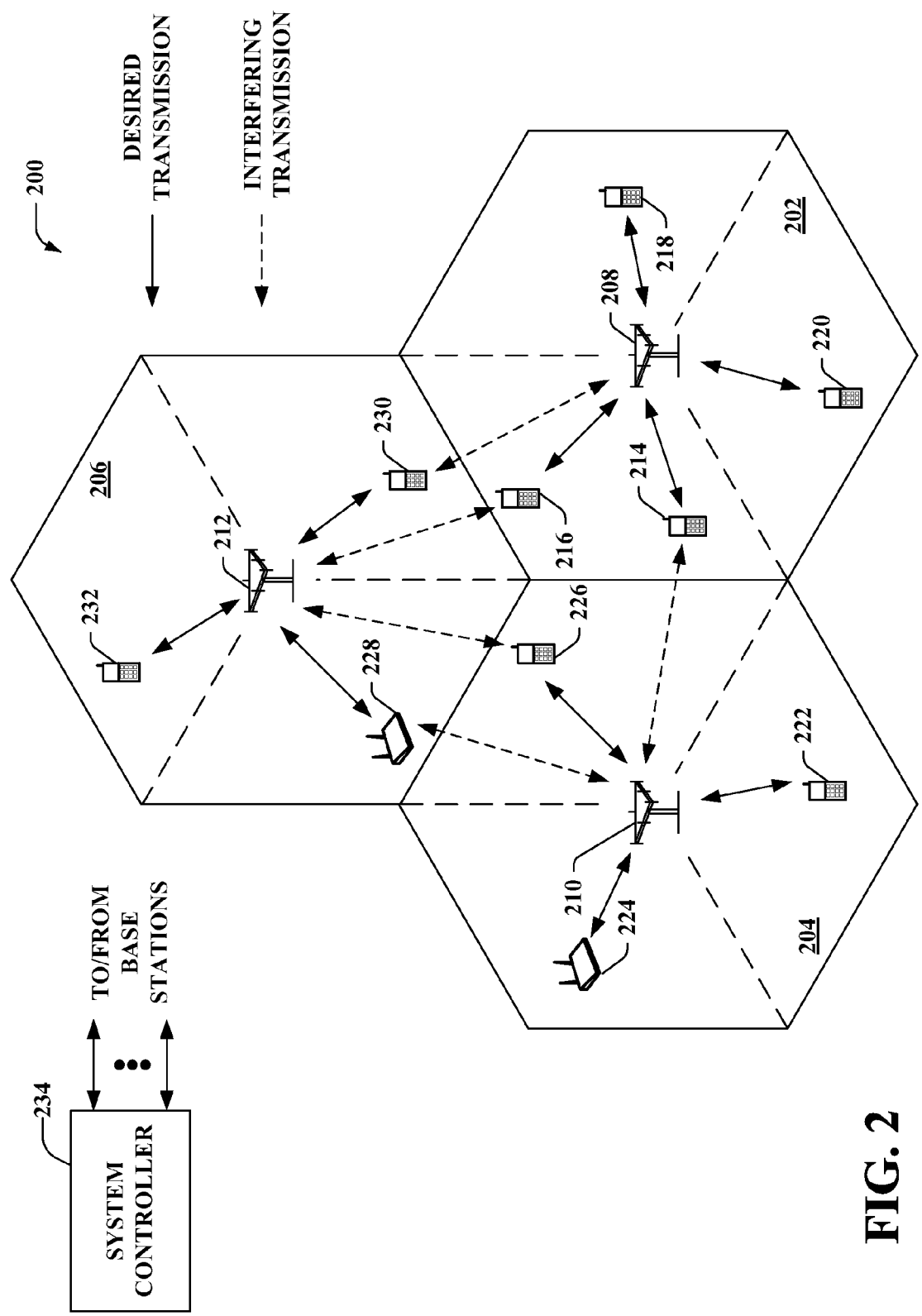
FIG. 2 is an illustration of an example multiple access wireless communication system according to various embodiments for signal transmission.

FIG. 2 illustrates a multiple access wireless communication system 200 according to various embodiments for signal transmission. Multiple access wireless communication system 200 can include multiple cells (e.g., cell 202, cell 204, and cell 206). As depicted, each cell 202-206 can include a respective base station 208, 210, 212, which can include one or more sectors. The sectors can be formed by groups of antennas, each responsible for communication with access terminals in a portion of the cell.

Each cell 202-206 can include a plurality of access terminals, which can be in communication with one or more sectors of each base station 208-212. For example, access terminals 214, 216, 218, and 220 are in communication with base station 208, access terminals 222, 224, and 226 are in communication with base station 210, and access terminals 228, 230, and 232 are in communication with base station 212.

As illustrated in relation to cell 204, for example, each access terminal 222, 224, and 226 can be located at a different position within cell 204. For instance, each access terminal 222, 224, and 226 can be at a different distance from the corresponding antenna group with which it is communicating. These factors, along with environmental and other conditions, can cause different channel conditions to be present between each access terminal 222, 224, and 226 and its corresponding antenna group with which it is communicating. Similarly, disparate channel conditions can be experienced between other access terminals (e.g., access terminals 214-220, 228-232, . . . ) and corresponding antenna groups with which they respectively communicate.

In accordance with some aspects, access terminals in a particular cell can be in communication with the base station associated with that cell and, at substantially the same time, be interfering with another base station associated with a different cell. For example, access terminal 214 can be in communication with base station 208 and can interfere with base station 210, access terminal 216 can be in communication with base station 208 and can interfere with base station 212, access terminal 226 can be in communication with base station 210 and can interfere with base station 212, access terminal 228 can be in communication with base station 212 and can interfere with base station 210, and access terminal 230 can be in communication with base station 212 and can interfere with base station 208.

A controller 234 can be coupled to each of cells 202, 204, and 206. Controller 234 can include one or more connections to one or more networks, such as the Internet, packet-data based networks, and/or circuit-switched voice networks, which provide information to, and from, access terminals in communication with the cells of multiple access wireless communication system 200. Controller 234 can include, or is coupled to, a scheduler configured to schedule transmission from and to access terminals. In some embodiments, scheduler can reside in each individual cell, each sector of a cell, or a combination thereof.

A cell can refer to a coverage area serviced by a base station. A cell can further include one or more sectors. For simplicity and clarity, the term "sector" can be used herein to refer to a cell, or a section of a cell, serviced by a base station. The terms "access terminal" and "user" can be used interchangeably, and the terms "sector" and "base station" can also be used interchangeably. A serving base station/sector can refer to a base station/sector with which an access terminal communicates.

According to an example, access terminal 214 can be served by base station 208 and can interfere with base station 210. Thus, base station 208 can be a serving base station and base station 210 can be an affected base station of access terminal 214. When affected base station 210 experiences degraded performance due to high interference levels (e.g., resultant from reverse link transmissions by access terminal 214, . . . ), affected base station 210 can yield interference-overload indications that can be sent via the forward link (e.g., to access terminal 214, . . . ). Although an active set corresponding to access terminal 214 can lack base station 210, access terminal 214 can obtain the interference-overload indications from affected base station 210. Further, based upon received interference-overload indications, access terminal 214 can determine that base station 210 is experiencing persistent and severe/unacceptable interference-overload, and send a special pilot strength report to serving base station 208. By utilizing information included in the pilot strength report, serving base station 208 can schedule resources for use in connection with access terminal 214 (as well as other served access terminals 216-220). For instance, serving base station 208 can inhibit access terminal 214 from utilizing a subset of resources (e.g., times, frequencies, antenna combinations, . . . ), and thus, this subset of resources can be scheduled by affected base station 210 for use by access terminals 222-226, which are served by base station 210. Hence, access terminals 222-226 can send reverse link transmissions by employing resources in the subset (e.g., which can be inhibited from use by access terminal 214, . . . ), and base station 210 can obtain these reverse link transmissions without interference from access terminal 214. Moreover, although not used by access terminal 214 as controlled by base station 208, the resources in the subset can be used by one or more other access terminals (e.g., access terminals 216-220, . . . ) being served by base station 208 (e.g., as controlled/scheduled by base station 208, . . . ). For instance, the resources in the subset can be used by other access terminals 216-220 being served by base station 208 that fail to significantly interfere with base station 210. In other words, base station 208 can exclude certain channel resources for use by access terminals that have sent the special pilot reports (e.g., triggered by interference-overload indications from another base-station such as base station 210 or base station 212, . . . ) in the recent past, but assign the same channel resources to other access terminals that have not sent such special pilot reports in the recent past (e.g., a certain designated length of time, . . . ). It is to be appreciated, however, that the claimed subject matter is not limited to the aforementioned example.

A serving base station (e.g., base station 208 per the above example, . . . ) can make a determination as to which resources to inhibit from being used by a served access terminal (e.g., offending access terminal, . . . ) that happens to be interfering with a disparate base station. According to an example, the disparate base station can be another base station (e.g., base station 210 and/or base station 212 per the above example, . . . ) in geographic proximity of the serving base station. Further, for instance, a rule generally agreed upon within system 200 can be leveraged to identify such resources. An example rule can be to reserve a predefined subset of resources that can be utilized by affected base station(s) (e.g., base station 210, ... ) for scheduling reverse link transmission(s) from access terminal(s) (e.g., access terminals 222-226, ... ) being served thereby while inhibiting offending access terminal(s) (e.g., access terminal 214, ... ) that cause interference at the affected base station(s) not included in respective active set(s) of the offending access terminal(s) from using the resources in the reserved, predefined subset. Accordingly, resources in the reserved, predefined subset can have a higher priority of use by lower power base stations (e.g., femto cell base stations, ... ), private base stations that deny access to one or more offending access terminals, and so forth.

Moreover, a serving base station (e.g., base station 208 in the aforementioned example, ... ) can utilize resources in the reserved, predefined subset for scheduling reverse link transmissions by served access terminals (e.g., access terminals 216-220, ... ) other than offending access terminal(s) (e.g., access terminal 214, ... ). Thus, the serving base station can manage the resources so that a portion of resources are available to potentially problematic access terminals while all or most of the resources can be available for use by other access terminals that fail to cause interference to other base station(s). Hence, the serving base station can use a set of resources by being selective about which resources to allocate to access terminal(s) that can potentially interfere with other base stations.

As shown in system 200, each sector can receive "desired" transmissions from access terminals within the sector as well as "interfering" transmissions from access terminals in other sectors. The total interference observed at each sector includes 1) intra-sector interference from access terminals within the same sector and 2) inter-sector interference from access terminals in other sectors. Intra-sector interference can be substantially eliminated using OFDMA transmission from the access terminals, which ensures orthogonality between transmissions of different access terminals in the same sector. The inter-sector interference, which is also called other sector interference (OSI), results from the transmissions in one sector not being orthogonal to the transmissions in the other sectors.

Figure 3:
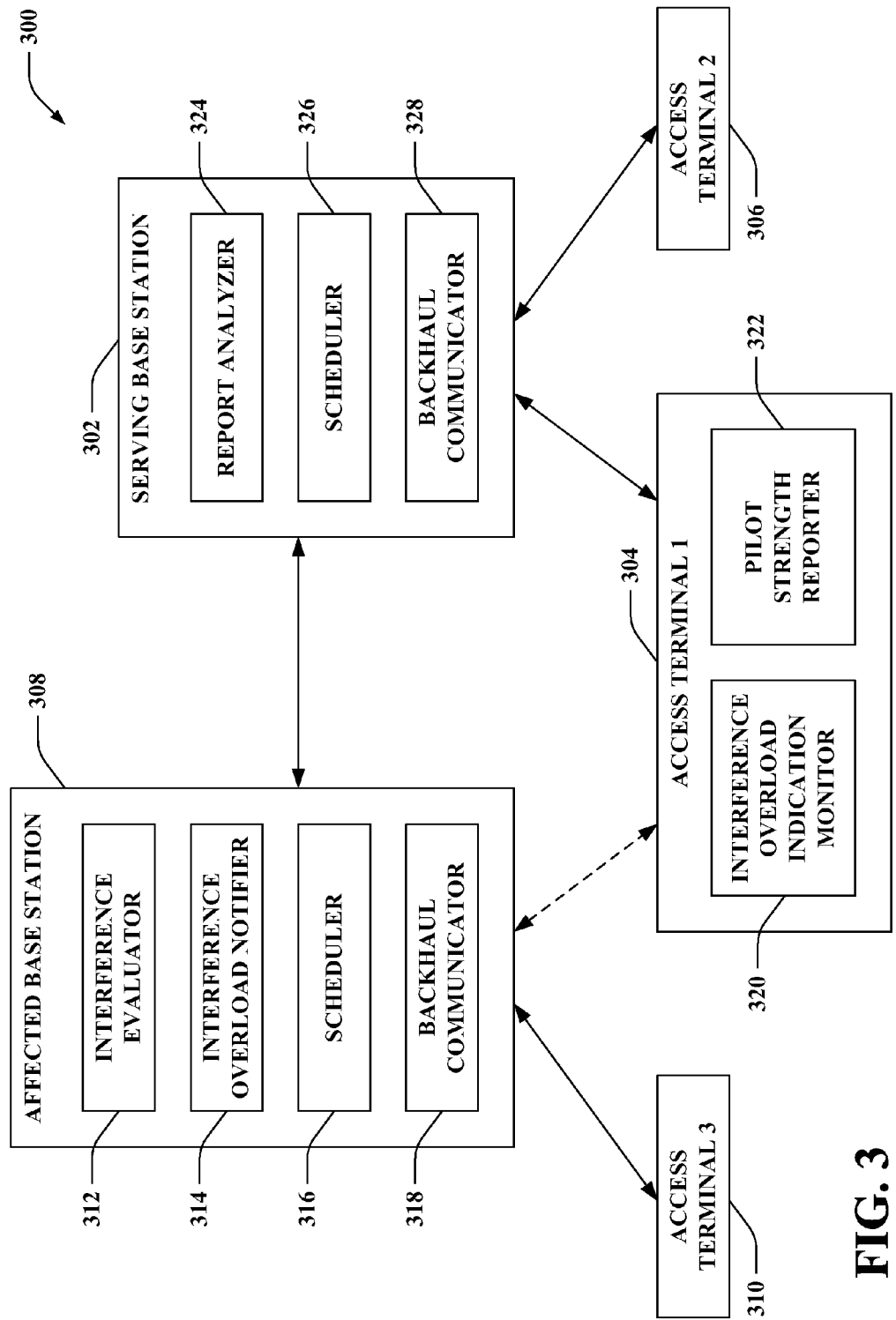
FIG. 3 is an illustration of an example system that utilizes interference-overload indications for allocating resources in a wireless communication environment.

Referring to FIG. 3, illustrated is a system 300 that utilizes interference-overload indications for allocating resources in a wireless communication environment. System 300 includes a serving base station 302 that can transmit and/or receive information, signals, data, instructions, commands, bits, symbols, and the like. Serving base station 302 can communicate with an access terminal 1 304 via the forward link and/or reverse link. Access terminal 1 304 can transmit and/or receive information, signals, data, instructions, commands, bits, symbols, and the like. Serving base station 302 can also communicate with an access terminal 2 306 (as well as any number of other access terminals that can be similar to access terminal 1 304 and/or access terminal 2 306) via the forward link and/or reverse link. Pursuant to the illustrated example, serving base station 302 can serve access terminal 1 304 and access terminal 2 306.

System 300 can further include an affected base station 308 that can transmit and/or receive information, signals, data, instructions, commands, bits, symbols, and the like. Affected base station 308 can communicate with an access terminal 3 310 via the forward link and/or reverse link; however, it is contemplated that affected base station 308 can communicate with any number of disparate access terminals (not shown) similar to access terminal 3 310. According to the depicted example, affected base station 308 can serve access terminal 3 310. Moreover, although not shown, it is contemplated that any number of base stations similar to serving base station 302 and/or affected base station 308 can be included in system 300 and/or any number of access terminals similar to access terminal 1 304, access terminal 2 306 and/or access terminal 3 310 can be included in system 300.

As illustrated, access terminal 1 304 can be served by serving base station 302. Further, when sending a reverse link transmission (e.g., intended for serving base station 302, ... ), access terminal 1 304 can cause excessive interference to affected base station 308. However, access terminal 1 304 can be unable to establish a radio link with affected base station 308; hence, an active set associated with access terminal 1 304 can exclude affected base station 308. Pursuant to another example, access terminal 1 304 can be unable to determine an identity of affected base station 308; however, the claimed subject matter is not so limited.

In some communication systems (e.g., some of the existing cellular networks), handoff decisions are based on forward link signal strength. This can be adequate if forward and reverse link qualities are reasonably balanced. Such an assumption would be violated, however, in a network where some base stations (e.g., femto cell base stations, affected base station 308, ... ) transmit at much lower power than other base stations (e.g., macro base stations, serving base station 302, ... ). In this case, although access terminal 1 304 can receive a very weak signal from the low-power, affected base station 308 in its vicinity, the transmission from access terminal 1 304 on the reverse link can cause excessive interference to the low-power, affected base station 308. Moreover, the low-power, affected base station 308 may not be added to the active set of access terminal 1 304, or even reported to serving base station 302 of access terminal 1 304, because these events are based solely on forward link signal strength exceeding certain thresholds. A base station that is not in the active set of an "interfering" or "offending" access terminal cannot effectively control interference generated by that interfering or offending access terminal on its reverse link.

There are also situations where, even if access terminal 1 304 receives sufficient signal level from a base station in its vicinity (e.g., affected base station 308, ... ), the base station may not be added to the active set of access terminal 1 304. This can be due to, for example, affected base station 308 being part of a private enterprise, which denies access to access terminals not belonging to the private group. In this scenario as well, the interference from access terminal 1 304 to the reverse link of the nearby affected base station 308 remains uncontrolled.

As a result, the aforementioned scenarios can cause severe performance degradation to affected base station 308. Accordingly, system 300 provides effective mechanisms to limit the interference from an access terminal to a base station that cannot be added to an active set of the access terminal (e.g., interference from access terminal 1 304 to affected base station 308, ... ), while enabling efficient operation within the wireless communication environment.

Conventional techniques that attempt to address the scenario where affected base station 308 is a low-power base station, and weak forward link signal strength is observed at access terminal 1 304 can be problematic at best. Common techniques oftentimes address this situation by injecting additional noise at the base station receiver, in inverse proportion to its transmit power level. In this manner, the forward and reverse links are balanced relative to the high-power macro base station. In effect, the noise injected on the reverse link "desensitizes" the low-power base station with respect to the signal received from the access terminal talking to a high-power base station. A notable drawback of this approach is the artificial reduction of link budget of the low-power base station on the reverse link. In a typical cellular network, the reverse link has a significant link budget deficit relative to the forward link; a motivation for including low-power base stations to such a network is to improve the link budget on the reverse link. Thus, solving the asymmetric interference problem by artificial noise injection defeats the purpose of reverse link budget enhancement through the deployment of low-power base stations.

Further, a common approach to the situation where affected base station 308 is a private base station with restricted access oftentimes involves deploying private cellular base stations (if any) on a different channel from public base stations. However, this approach leads to loss of trunking efficiency and inefficient spectral usage in practice.

Further, although similar issues are addressed through carrier-sense and backoff mechanisms in some conventional fixed wireless networks (e.g., WiFi type systems, . . . ), such fixed wireless networks are considerably different from the mobile cellular networks (which employ sophisticated mobility and interference management using active sets and handoff, in order to enhance spectral efficiency and connection robustness).

As depicted, affected base station 308 can include an interference evaluator 312, an interference overload notifier 314, a scheduler 316, and a backhaul communicator 318. Interference evaluator 312 can analyze interference caused by non-served access terminal(s) in proximity (e.g., access terminal 1 304, . . . ). Further, interference overload notifier 314 can generate and/or transmit interference-overload indications that can be sent to the interfering access terminal(s). And, scheduler 316 can allocate resources to be utilized by access terminal(s) served by affected base station 308 (e.g., access terminal 3 310, . . . ). Additionally, backhaul communicator 318 can enable communicating with disparate base station(s) (e.g., serving base station 302, via a backhaul.

Access terminal 1 304 can further include an interference overload indication monitor 320 and a pilot strength reporter 322. Interference overload indication monitor 320 can listen for and/or receive interference-overload indication(s) sent by affected base station 308 (and/or any disparate affected base station(s) (not shown)). Further, when access terminal 1 304 (e.g., interference overload indication monitor 320 based upon analysis of the received interference-overload indications, recognizes that it may be interfering with affected base station 308, pilot strength reporter 322 can yield and/or transmit a pilot strength report to serving base station 302. The pilot strength report can notify serving base station 302 that access terminal 1 304 may be excessively interfering with affected base station 308.

Serving base station 302 can further include a report analyzer 324, a scheduler 326, and a backhaul communicator 328. Report analyzer 324 can receive and/or evaluate pilot strength report(s) obtained from served access terminal(s) (e.g., access terminal 1 304, access terminal 2 306, . . . ). For instance, report analyzer 324 can recognize based upon the obtained pilot strength report(s) that access terminal 1 304 is yielding a significant level of interference to affected base station 308. Accordingly, scheduler 326 can reserve certain resources to be excluded from use by access terminal 1 304. However, these reserved resources can be allocated by scheduler 326 for utilization by other access terminals (e.g., access terminal 2 306, . . . ) being served by serving base station 302 that are not determined to be interfering with other base station(s). Moreover, the reserved resources can be allotted by scheduler 316 of affected base station 308 to be employed by access terminal(s) served thereby (e.g., access terminal 3 310, . . . ); thus, reverse link transmission utilizing these reserved resources from access terminal 3 310 can be received by affected base station 308, while interference from access terminal 1 304 can be mitigated. Further, backhaul communicator 328 can enable communicating with disparate base station(s) (e.g., affected base station 308, . . . ) via the backhaul.

Although not shown, it is to be appreciated that affected base station 308 can include a report analyzer similar to report analyzer 324. Moreover, it is contemplated that serving base station 302 can include an interference evaluator similar to interference evaluator 312 and/or an interference overload notifier similar to interference overload notifier 314. According to a further example, it is to be appreciated that access terminal 2 306 and/or access terminal 3 310 can include an interference overload indication monitor similar to interference overload indication monitor 320 and/or a pilot strength reporter similar to pilot strength reporter 322.

In system 300, interference overload indication monitor 320 of access terminal 1 304 is able to monitor interference-overload indications from affected base station 308 (e.g., yielded by interference evaluator 312 and/or interference overload notifier 314, . . . ), even though the forward link signal strength from affected base station 308 may not be sufficiently strong to trigger a pilot strength report. In some aspects, access terminal 1 304 can be required to send a pilot strength report (e.g., via pilot strength reporter 322, . . . ) for affected base station 308 irrespective of its pilot strength, if the interference-overload indications from affected base station 308 indicate a strong jamming scenario (e.g., as measured via interference overload indication monitor 320 by some criteria and/or threshold values applied to appropriately filtered interference-overload indications) in the sector/cell served by affected base station 308. Serving base station 302 receiving such a (interference-induced) pilot strength report from access terminal 1 304 can command (e.g., via scheduler 326, . . . ) access terminal 1 304 not to transmit on certain channel resources (e.g., parameterized by time, frequency, and spatial dimensions, . . . ). As a result, affected base station 308 can use these interference-free resources to serve its own users (e.g., access terminal 3 310, In some existing systems, pilot strength reports can be generated by the access terminal and provided to the serving base station whenever the forward link signal strength from a base station goes above certain thresholds (e.g., T_add, T_comp, . . . ), and/or the strength remains below certain thresholds (e.g., T_drop) for certain durations of time (e.g., T_Tdrop). In contrast, according to an example, access terminal 1 304 can be required to send a pilot strength report even if none of the above events are triggered, so long as access terminal 1 304 (e.g., interference overload indication monitor 320, . . . ) detects a high-interference indication from affected base station 308 in its vicinity.

In some systems (e.g., 1xEV-DO systems, UMB type systems, . . . ), a base station transmits interference-overload indications (e.g., reverse activity bit (RAB) in 1xEV-DO type systems, other sector interference channel (F-OSICH) or other sector interference bit (F-OSI bit) in UMB type systems, . . . ) at regular intervals (e.g., once a slot, once a superframe, . . . ), which is indicative of the interference level associated with the underlying sector/cell served by the base station. The overload indications can be binary valued (such as in the case of RAB), or can admit more than two values (e.g., three values, as in the case of F-OSICH, . . . ). Further, an interference-overload channel is often designed to have much deeper penetration than the overall coverage of a base station; in such situation, an access terminal (e.g., access terminal 1 304, . . . ) can be able to detect the interference-overload indication from a base station (e.g., affected base station 308, . . . ) even though the forward link signal from the base station is not sufficiently strong to warrant the base station being included in an active set of the access terminal. In other words, the access terminal can be able to monitor the interference-overload indications from the base station, though it is not required to send a pilot strength report for that base station according to the existing systems.

By way of illustration, if access terminal 1 304 detects high-level interference indications with interference overload indication monitor 320 from affected base station 308 for sustained periods of time, it can be required to send a pilot strength report (e.g., via pilot strength reporter 322, . . . ) for affected base station 308 to the serving base station 302, irrespective of the forward link signal strength of affected base station 308. In other words, access terminal 1 304 can send a pilot strength report for affected base station 308 either based on the forward link signal strength of affected base station 308, or if access terminal 1 304 deems affected base station 308 (or the sector served by affected base station 308) to be in an "interference-panic" state. The "interference-panic" state can refer, for instance, to a situation where transmission of interference-overload indications (e.g., RAB, F-OSICH, . . . ) by interference overload notifier 314 exceeding a threshold level occurs for at least M out of N transmission opportunities, where M and N can be integers and M is less than or equal to N. The "interference-panic" state can also be associated with an event where a filtered value of the interference-overload indications from affected base station 308 exceeds a certain threshold. In a TDD system, access terminal 1 304 can also include information relating to the spatial channel between itself and affected base station 308 in the pilot strength report (e.g., yielded by pilot strength reporter 322, . . . ), so that serving base station 302 can instruct access terminal 1 304 to use (e.g., via scheduler 326, . . . ), for example, combinations of transmit antennas which can cause less interference to affected base station 308.

Upon receiving the pilot strength report from access terminal 1 304 based on the "interference-panic" state, serving base station 302 (e.g., report analyzer 324, . . . ) can take appropriate actions to protect affected base station 308 from sustained interference/jamming from access terminal 1 304. In an aspect, serving base station 302 (e.g., scheduler 326, . . . ) can put access terminal 1 304 in a selected interlace mode, wherein access terminal 1 304 is allowed to transmit on the reverse link on certain known time-slots and is required to be silent on the remaining time-slots. For example, access terminal 1 304 can be forbidden from transmission of every nth (e.g., 4th, . . . ) slot, or on any slot t that satisfies t mod $N = n_1$ or $n_2$ or $n_3$ or . . . $n_k$. In other words, in an N-interlace structure, access terminal 1 304 can be forbidden to transmit on interlaces identified by $n_1$ or $n_2$ or $n_3$ or . . . $n_k$. Meanwhile, these resources can be utilized for transmission by other access terminals (e.g., access terminal 2 306, . . . ) served by serving base station 302.

As a result, affected base station 308 (a base station in the vicinity, but not in the active set of access terminal 1 304) is not jammed/interfered by access terminal 1 304 on certain fixed time-slots. Affected base station 308 can schedule (e.g., via scheduler 316, . . . ) its own users (e.g., access terminal 3 310, . . . ) (in the corresponding sector) on the interference-free time slots, thereby leading to improved performance of its own users on these time slots.

In some aspects, serving base station 302 (e.g., backhaul communicator 328, . . . ) can use the backhaul to inform affected base station 308 which time-slots would be free of interference from a given access terminal (e.g., access terminal 1 304, . . . ). Alternatively or additionally, affected base station 308 can gather such information by monitoring the interference on its different reverse link interlaces.

In some aspects, serving base station 302 can respond to the pilot strength reports based on the "interference-panic" state in other ways. For example, instead of forbidding access terminal 1 304 to transmit on certain time-slots altogether, serving base station 302 can forbid access terminal 1 304 to transmit on certain subsets of transmission resources during certain resources. These subsets can be based on partitioning the signal degrees of freedom in time, frequency and/or spatial dimensions. In other words, a subset of resources can include certain groups of subcarriers/tones, certain symbols within a slot, and/or certain combinations of transmit antennas. In a TDD system, where the pilot report includes the spatial channel information for the channel between itself and affected base station 308, then serving base station 302 can command access terminal 1 304 to use those combinations of transmit antennas that are likely to cause the least interference to affected base station 308. Affected base station 308 can schedule (e.g., with scheduler 316, . . . ) its own users (e.g., access terminal 3 310, . . . ) to transmit on the complementary sets of resources on interlaces that are not used by the interfering access terminals (e.g., access terminal 1 304, . . . ).

An effective response to interference-panic-based pilot strength reports is to partition the signal resources between the offending access terminal (e.g., access terminal 1 304, . . . ) and other access terminals (e.g., access terminal 3 310, . . . ) in the sector served by affected base station 308, so that they can operate well within their respective partitions.

The particular response (e.g., avoiding transmission on entire interlaces, or only on certain subsets of resources) can depend on the severity of interference caused by the interfering access terminal (e.g., access terminal 1 304, . . . ). For example, if access terminal 1 304 causes such a high interference as to "desense" a receiver of affected base station 308 (e.g., by overwhelming the dynamic range of the receiver hardware), then avoiding transmission of entire interlaces can be called for, to mitigate the jamming effect of the access terminal. If the interference from access terminal 1 304 is well within the receiver dynamic range of the receiver but strong enough to reduce the signal-to-noise-and-interference ratio (SINR) of the users (e.g., access terminal 3 310, . . . ) served by affected base station 308 significantly, access terminal 1 304 can be commanded to vacate only a part of time-frequency-spatial and/or other resources, which can then be used efficiently by the users served by that affected base station 308. To facilitate this level of optimization, the pilot strength report generated by pilot strength reporter 322 based on the "interference-panic" state can indicate the severity of the interference being caused (e.g., receiver desense or just SINR degradation). Access terminal 1 304 can make this determination based on the interference-overload indications from affected base station 308. For example, less stringent criteria on interference-overload indications can be used to define a "low-panic" state (e.g., SINR degradation without receiver desense) in some situations; more stringent criteria can be used to define the "high-panic" state (e.g., receiver desense) in other situations, which can require entire interlaces to be taken away from access terminal 1 304. Such can be further facilitated by defining some interference-overload levels (e.g., associated with indications such as RAB or F-OSICH)

to indicate receiver desense, and other levels to indication interference overload without receiver desense.

As described above, the interference overload indications from affected base station 308 can be used to differentiate between interference leading to receiver dense or SINR-degradation. These indications can be filtered and processed by access terminal 1 304 (e.g., interference overload indication monitor 320, pilot strength reporter 322, ... ) to provide "low interference-panic," "high interference-panic," or other levels of granularity in interference-overload indication in the pilot strength report provided by pilot strength reporter 322 to serving base station 302. If affected base station 308 cannot be included in the active set of access terminal 1 304 and does not serve access terminal 1 304, serving base station 302 can put access terminal 1 304 in selected-interlace mode (e.g., forbidden to transmit on some interlaces, or scheduled to transmit only on certain subsets of resources on each interlace). Serving base station 302 can inform affected base station 308 (e.g., over the backhaul) that the offending access terminal (e.g., access terminal 1 304, ... ) has been scheduled in this restricted manner. Affected base station 308 can use the resources vacated by the offending access terminal (e.g., access terminal 1 304, ... ) to serve its own access terminal(s) (e.g., access terminal 3 310, ... ).

Figure 4:
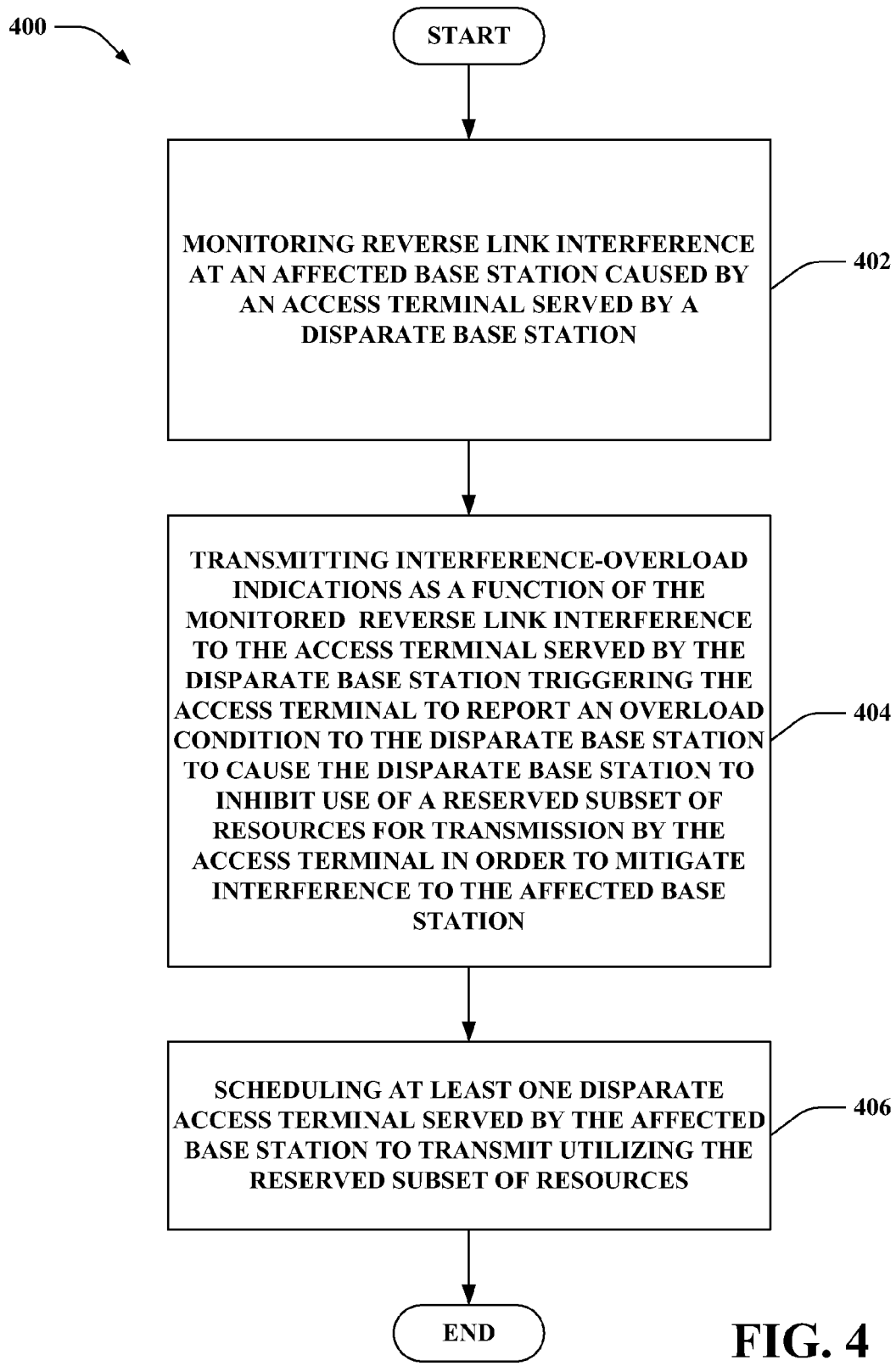
FIG. 4 is an illustration of an example methodology that facilitates mitigating reverse link interference in a wireless communication environment.
Figure 5:
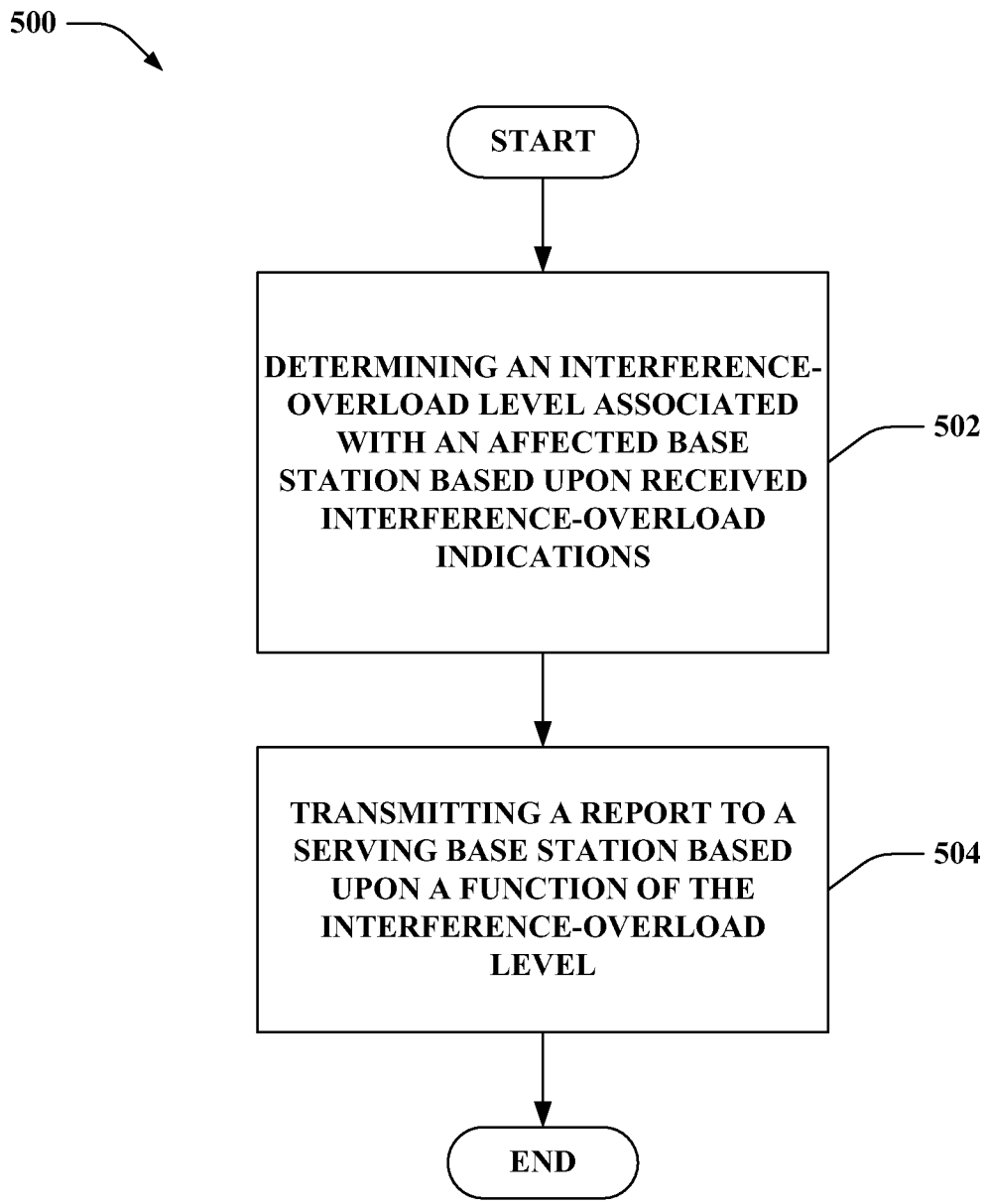
FIG. 5 is an illustration of an example methodology that facilitates yielding a report in response to interference indications in a wireless communication environment.
Figure 6:
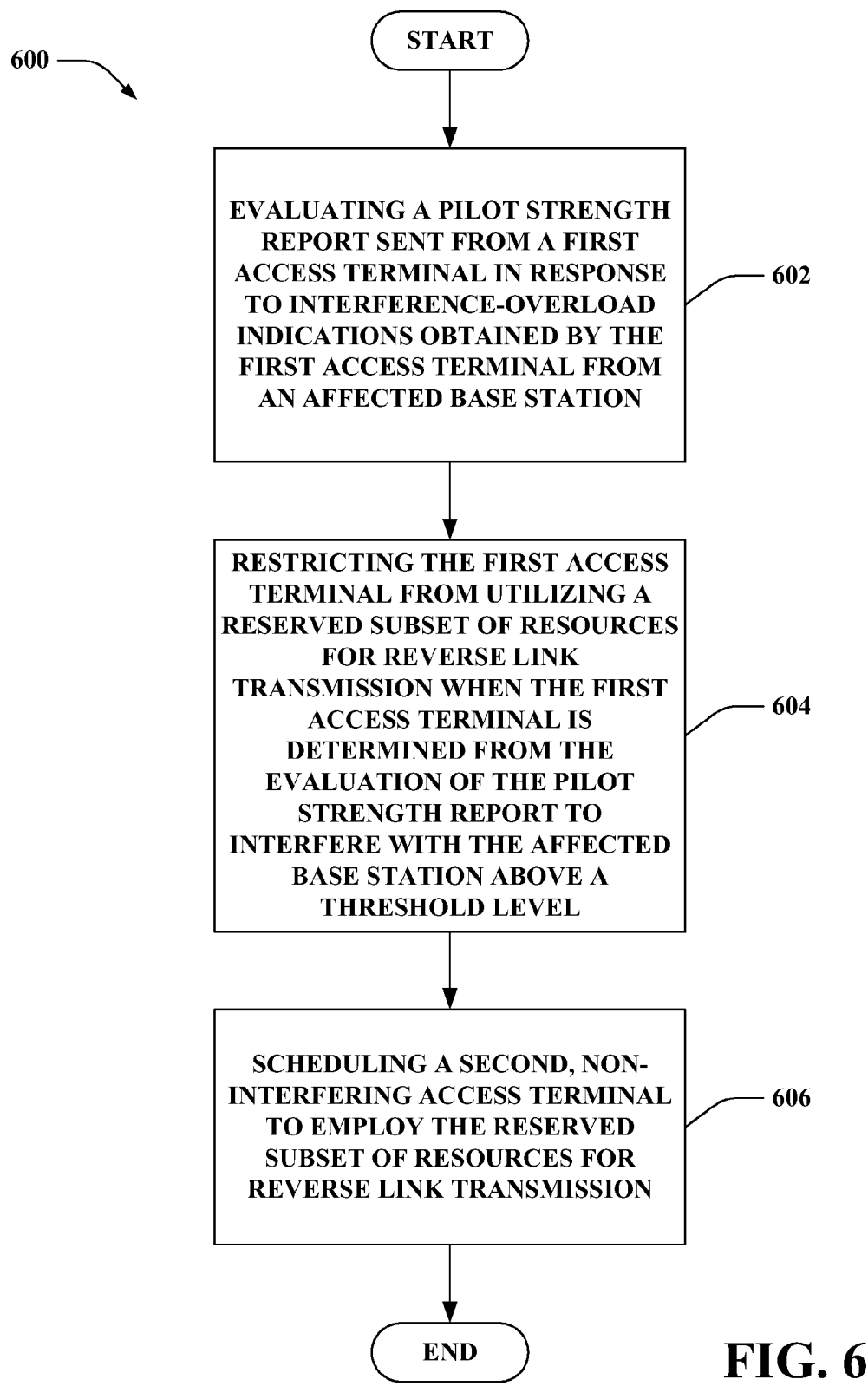
FIG. 6 is an illustration of an example methodology that facilitates controlling a served access terminal to mitigate reverse link interference caused to a disparate base station.

Referring to FIGS. 4-6, methodologies relating to controlling interference utilizing interference-overload indications in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 4, illustrated is a methodology 400 that facilitates mitigating reverse link interference in a wireless communication environment. At 402, reverse link interference at an affected base station caused by an access terminal served by a disparate base station can be monitored. For instance, the affected base station can fail to be included in an active set associated with the access terminal; thus, the affected base station can be unable to effectively control reverse link interference caused by the access terminal (e.g., utilizing conventional techniques, ... ). According to another example, a signal from the affected base station can fail to be sufficiently strong to trigger a pilot strength report being sent by the access terminal in an absence of the interference-overload indications. Further, the affected base station can be a pico cell base station or a femto cell base station that transmits at a lower power compared to a macro cell base station, for example. Pursuant to another example, the affected base station can be a base station that is part of a private enterprise, which denies access to the access terminal. Moreover, the reverse link interference caused by the access terminal can be compared to a threshold value to determine whether an interference level is excessive. For instance, the reverse link interference can desense a receiver of the affected base station by overwhelming a dynamic range of the receiver hardware, significantly reduce a signal-to-noise-and-interference ratio (SINR) of access terminal(s) served by the affected base station, and the like.

At 404, interference-overload indications can be transmitted as a function of the monitored reverse link interference to the access terminal served by the disparate base station triggering the access terminal to report an overload condition to the disparate base station to cause the disparate base station to inhibit use of a reserved subset of resources for transmission by the access terminal in order to mitigate interference to the affected base station. The interference-overload indications each can include one of a reverse activity bit or an other sector interference value, for example. Further, the interference-overload indications can be transmitted via a channel that has deeper penetration than a coverage area of the affected base station. Moreover, the reserved subset of resources can be parameterized by time, frequency, and/or spatial dimensions. Thus, for example, the reserved subset of resources can include one or more time slots, one or more interlaces, one or more subcarriers/tones, certain symbols within particular time slot(s), particular combinations of transmit antennas, a combination thereof, and so forth; however, the claimed subject matter is not so limited. Pursuant to a further illustration, a notification identifying resources included in the reserved subset can be received from the disparate base station via a backhaul. By way of another example, resources included in the reserved subset can be predefined (e.g., within the wireless communication environment, ... ). According to another illustration, resources included in the reserved subset can be determined by continuing to monitor reverse link interference (e.g., reverse link interference associated with the reserved subset of resources can decrease as the disparate base station inhibits use of the reserved subset of resources by the access terminal, ... ). Additionally or alternatively, a condition of persistent and severe overload can be explicitly indicated to the access terminal by the affected base station. Such condition can be explicitly indicated by using a dedicated interference control channel, an embedded bit (e.g., a bit embedded in a synchronization/preamble signal or a broadcast message, ... ), a bit employed for modulation or scrambling (e.g., a bit used to modulate or scramble a synchronization/preamble signal or a broadcast message, ... ), and so forth. At 406, at least one disparate access terminal served by the affected base station can be scheduled to transmit utilizing the reserved subset of resources. Accordingly, the affected base station can receive reverse link transmission(s) from the at least one disparate access terminal sent utilizing the reserved subset of resources with decreased reverse link interference. Further, the disparate base station can exclude the reserved subset of resources for use by the access terminal sent the interference-overload indications and can assign the reserved subset of resources to other non-interfering access terminals.

Now turning to FIG. 5, illustrated is a methodology 500 that facilitates yielding a report in response to interference indications in a wireless communication environment. At 502, an interference-overload level associated with an affected base station can be determined based upon received interference-overload indications. For instance, the affected base station can fail to be included in a corresponding active set (e.g., of an access terminal that can receive the interference-overload indications, Further, a signal from the affected base station can fail to be sufficiently strong to trigger transmission of a pilot strength report in an absence of the interference-overload indications. A channel can be monitored for interference-overload indications from the affected base station even though a forward link signal strength from the affected base station may not be sufficiently strong to trigger a pilot strength report for the affected base station (e.g., according to conventional techniques, ... ). Further, the interference-overload indications can be filtered, measured by criteria, and/or compared to a threshold value to determine the interference-overload level. By way of example, the interference-overload level can be identified to be at a high level when interference-overload indications are received from the affected base station during at least M out of N transmission opportunities (e.g., above a threshold value, . . . ), where M and N can be integers and M is less than or equal to N. Pursuant to another illustration, the interference-overload level can correspond to a severity of interference being caused to the affected base station (e.g., receiver desense, SINR degradation, interference below an acceptable level, . . . ), which can be evaluated based upon the received interference-overload indications.

At 504, a report can be transmitted to a serving base station based upon a function of the interference-overload level. The report, for example, can be a pilot strength report or an interference overload report (e.g., a report that provides information corresponding to the interference-overload level and/or the received interference-overload indications, . . . ). For instance, the function can be whether the interference-overload level exceeds a threshold value. Transmission of the report can be interference induced. For example, when a high level of interference overload is identified from the affected base station for a sustained period of time, the report can be sent to the serving base station. The pilot strength report, for instance, can include an indication related to the severity of interference being caused to the affected base station. Moreover, the transmitted pilot strength report can also include information relating to a spatial channel between the transmitting access terminal and the affected base station. Further, in response to the transmitted report, an indication can be received from the serving base station inhibiting use of a reserved subset of resources for reverse link transmission.

Referring to FIG. 6, illustrated is a methodology 600 that facilitates controlling a served access terminal to mitigate reverse link interference caused to a disparate base station. At 602, a pilot strength report sent from a first access terminal in response to interference-overload indications obtained by the first access terminal from an affected base station can be evaluated. For instance, the affected base station can be excluded from an active set of the first access terminal. Additionally or alternatively, a signal from the affected base station can fail to be sufficiently strong to trigger a pilot strength report being sent by the access terminal in an absence of the interference-overload indications. According to an example, the first access terminal can be recognized from the pilot strength report as causing reverse link interference that exceeds a threshold at the affected base station. Further, the pilot strength report can be received at a base station that serves the first access terminal. At 604, the first access terminal can be restricted from utilizing a reserved subset of resources for reverse link transmission when the first access terminal is determined from the evaluation of the pilot strength report to interfere with the affected base station above a threshold level. For example, the reserved subset of resources can be parameterized by time, frequency, and/or spatial dimensions. Thus, for instance, the reserved subset of resources can include one or more time slots, one or more interlaces, one or more subcarriers/tones, certain symbols within particular time slot(s), particular combinations of transmit antennas, a combination thereof, and so forth; however, the claimed subject matter is not so limited. By way of another illustration, resources included in the reserved subset can be a function of an amount of interference caused by the first access terminal to the affected base station. In accordance with a further example, a message can be sent to the affected base station (e.g., via a backhaul, . . . ) informing the affected base station as to the restriction (e.g., resources included in the reserved subset, . . . ) placed upon the first access terminal. At 606, a second, non-interfering access terminal can be scheduled to employ the reserved subset of resources for reverse link transmission. Moreover, the second, non-interfering access terminal can be served by the same base station that serves the first access terminal.

It will be appreciated that, in accordance with one or more aspects described herein, inferences can be made regarding controlling reverse link interference utilizing interference-overload indications in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining an interference level associated with an affected base station as a function of interference-overload indications received from the affected base station. By way of further illustration, an inference can be made related to determining optimal resources to include in a reserved subset of resources, which can be inhibited from being employed by an access terminal deemed to be interfering with an affected base station not included in an active set of the access terminal. It will be appreciated that the foregoing examples are illustrative in nature and are not intended to limit the number of inferences that can be made or the manner in which such inferences are made in conjunction with the various embodiments and/or methods described herein.

Figure 7:
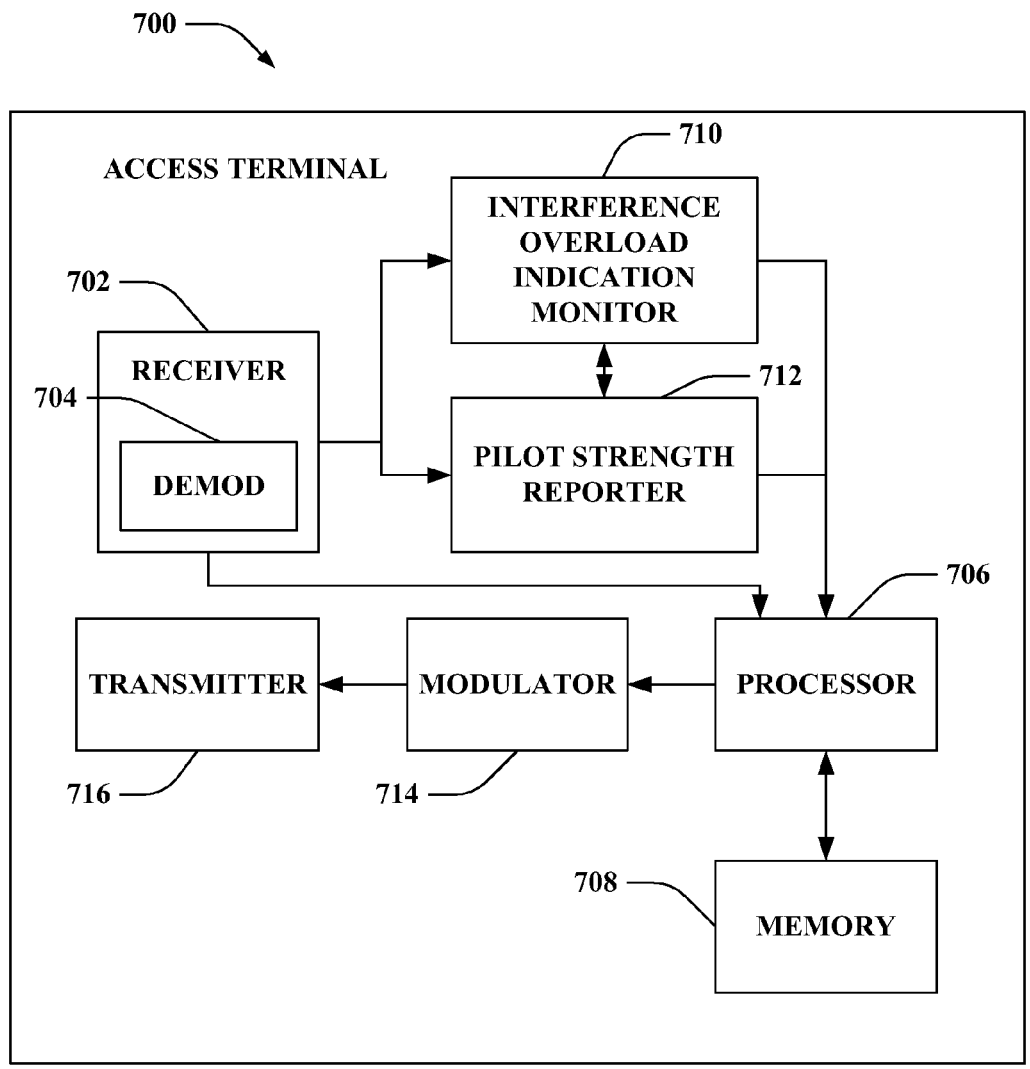
FIG. 7 is an illustration of an example access terminal that generates pilot strength reports based upon interference-overload indications in a wireless communication system.

FIG. 7 is an illustration of an access terminal 700 that generates pilot strength reports based upon interference-overload indications in a wireless communication system. Access terminal 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of access terminal 700, and/or a processor that both analyzes information received by receiver 702, generates information for transmission by transmitter 716, and controls one or more components of access terminal 700.

Access terminal 700 can additionally comprise memory 708 that is operatively coupled to processor 706 and that can store data to be transmitted, received data, and any other suitable information related to performing the various actions and functions set forth herein. Memory 708, for instance, can store protocols and/or algorithms associated with analyzing interference-overload indication(s) obtained from a base station (e.g., affected base station, . . . ) not included in an active set of access terminal 700. Further, memory 708 can store protocols and/or algorithms for analyzing an interference-overload level experienced by this base station caused by reverse link transmission(s) from access terminal 700.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to an interference overload indication monitor 710 and/or a pilot strength reporter 712. Interference overload indication monitor 710 can be substantially similar to interference overload indication monitor 320 of FIG. 3. Moreover, pilot strength reporter 712 can be substantially similar to pilot strength reporter 322 of FIG. 3. Interference overload indication monitor 710 can obtain and/or evaluate interference-overload indications received from an affected base station that may not be included in an active set of access terminal 700. For instance, based upon the evaluation, interference overload indication monitor 710 can recognize a reverse link interference level experienced by such affected base station. Further, pilot strength reporter 712 can generated and/or send a pilot strength report to a disparate base station that serves access terminal 700. The pilot strength report can be transmitted by access terminal 700 as a function of the recognized interference level. Moreover, pilot strength reporter 712 can include information related to the received interference-overload indications in the yielded pilot strength report intended for the serving base station. Access terminal 700 still further comprises a modulator 714 and a transmitter 716 that transmits the signal to, for instance, a base station, another access terminal, etc. Although depicted as being separate from the processor 706, it is to be appreciated that interference overload indication monitor 710, pilot strength reporter 712 and/or modulator 714 can be part of processor 706 or a number of processors (not shown).

Figure 8:
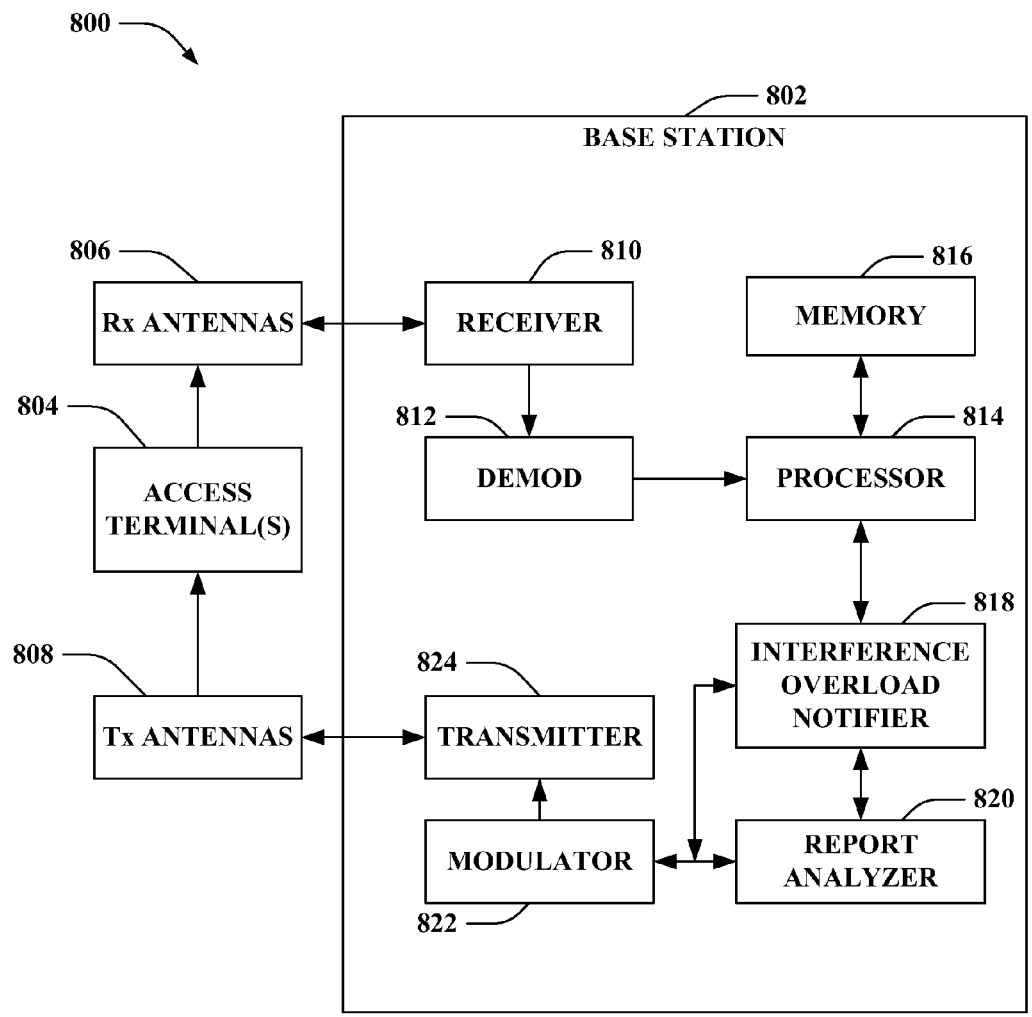
FIG. 8 is an illustration of an example system that mitigates reverse link interference based upon interference-overload indications in a wireless communication environment.

FIG. 8 is an illustration of a system 800 that mitigates reverse link interference based upon interference-overload indications in a wireless communication environment. System 800 comprises a base station 802 (e.g., access point, . . . ) with a receiver 810 that receives signal(s) from one or more access terminals 804 through a plurality of receive antennas 806, and a transmitter 824 that transmits to the one or more access terminals 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores data to be transmitted to or received from access terminal(s) 804 (or a disparate base station (not shown)) and/or any other suitable information related to performing the various actions and functions set forth herein. Processor 814 is further coupled to an interference overload notifier 818 that can yield interference-overload indications as a function of measured reverse link interference from a non-served access terminal. Moreover, base station 802 can additionally or alternatively include a report analyzer 820 that can receive and/or review a pilot strength report from a served access terminal. Based upon the evaluation of the pilot strength report from the served access terminal, base station 802 can inhibit use of a reserved subset of resources by the served access terminal. It is contemplated that interference overload notifier 818 can be substantially similar to interference overload notifier 314 of FIG. 3 and/or report analyzer 820 can be substantially similar to report analyzer 324 of FIG. 3. Further, although not shown, it is to be appreciated that base station 802 can further include an interference evaluator (e.g., which can be substantially similar to interference evaluator 312 of FIG. 3, . . . ), a scheduler (e.g., which can be substantially similar to scheduler 316 and/or scheduler 326 of FIG. 3, . . . ) and/or a backhaul communicator (e.g., which can be substantially similar to backhaul communicator 318 and/or backhaul communicator 328 of FIG. 3, . . . ). By way of further illustration, interference overload notifier 818 and/or report analyzer 820 (and/or scheduler (not shown) and/or backhaul communicator) can provide information to be transmitted to a modulator 822. Modulator 822 can multiplex a frame for transmission by a transmitter 824 through antennas 808 to access terminal(s) 804. Although depicted as being separate from the processor 814, it is to be appreciated that interference overload notifier 818, report analyzer 820, and/or modulator 822 can be part of processor 814 or a number of processors (not shown).

Figure 9:
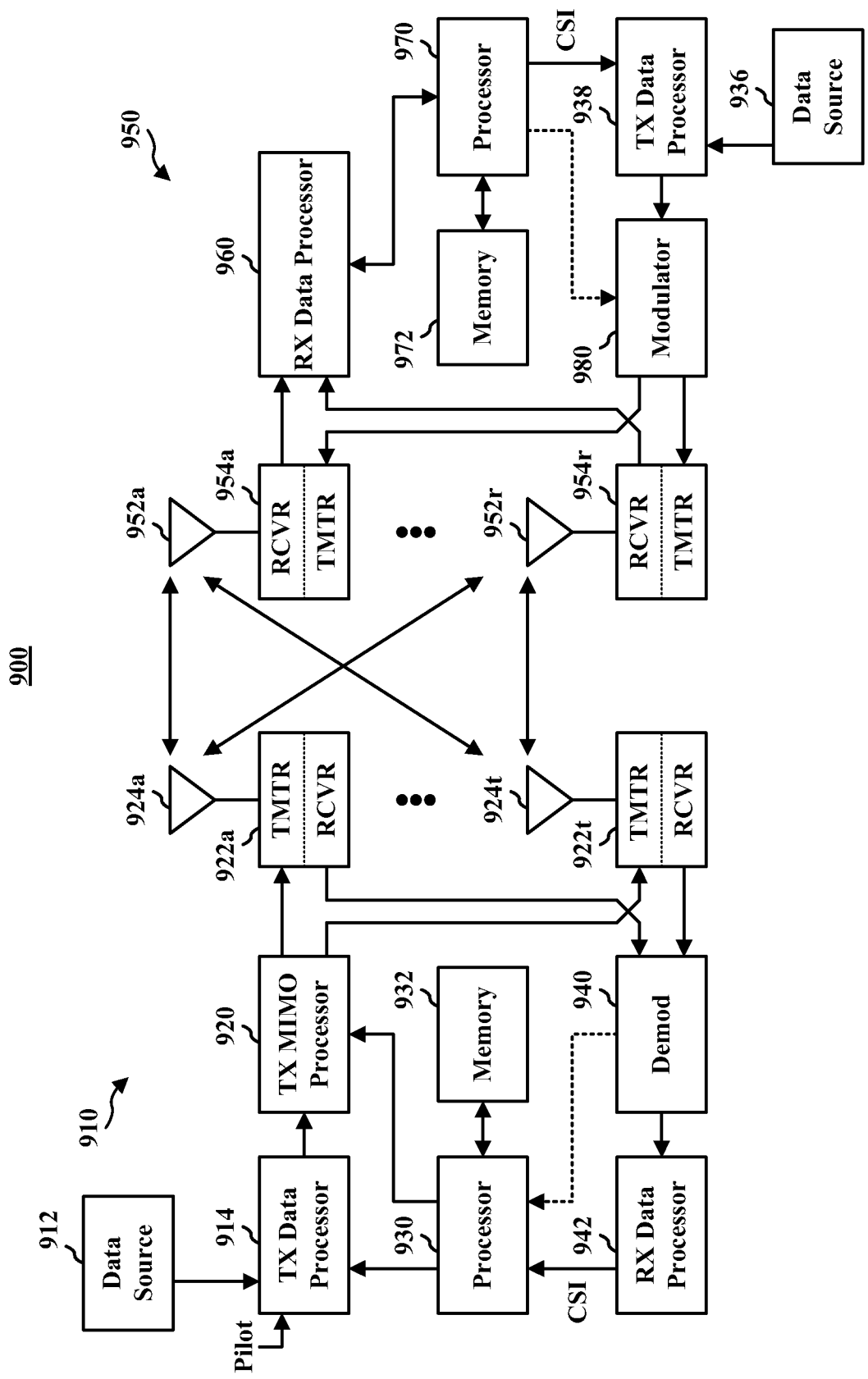
FIG. 9 is an illustration of an example wireless network environment that can be employed in conjunction with the various systems and methods described herein.

FIG. 9 shows an example wireless communication system 900. The wireless communication system 900 depicts one base station 910 and one access terminal 950 for sake of brevity. However, it is to be appreciated that system 900 can include more than one base station and/or more than one access terminal, wherein additional base stations and/or access terminals can be substantially similar or different from example base station 910 and access terminal 950 described below. In addition, it is to be appreciated that base station 910 and/or access terminal 950 can employ the systems (FIGS. 1-3, 7-8, and 10-11) and/or methods (FIGS. 4-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At access terminal 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which available technology to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from access terminal 950 are received by antennas 924, conditioned by receivers 922, demodulated by a demodulator 940, and processed by a RX data processor 942 to extract the reverse link message transmitted by access terminal 950. Further, processor 930 can process the extracted message to determine which preceding matrix to use for determining the beamforming weights.

Processors 930 and 970 can direct (e.g., control, coordinate, manage, etc.) operation at base station 910 and access terminal 950, respectively. Respective processors 930 and 970 can be associated with memory 932 and 972 that store program codes and data. Processors 930 and 970 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents.

Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
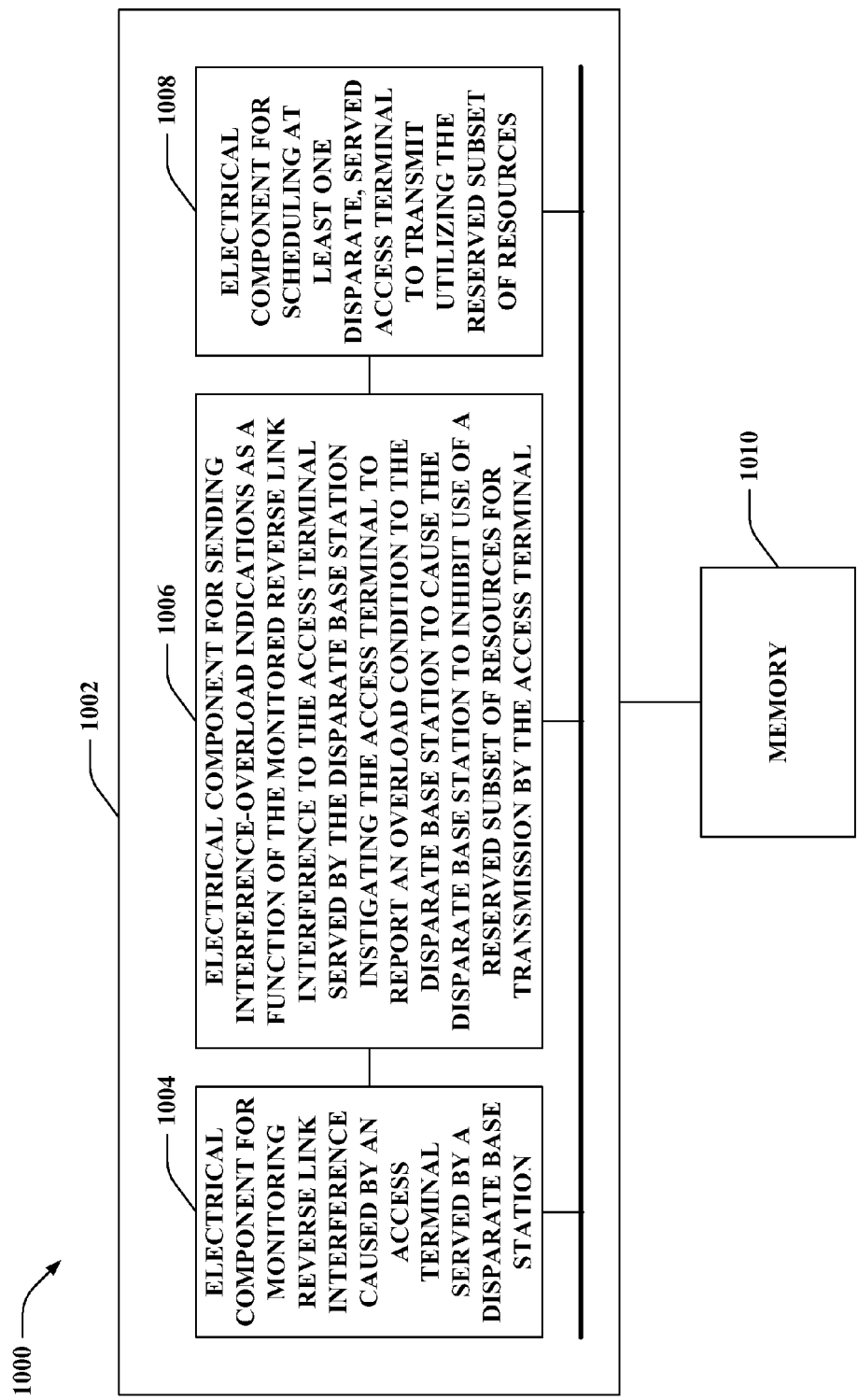
FIG. 10 is an illustration of an example system that enables mitigating reverse link interference in a wireless communication environment.

With reference to FIG. 10, illustrated is a system 1000 that enables mitigating reverse link interference in a wireless communication environment. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for monitoring reverse link interference caused by an access terminal served by a disparate base station 1004. Moreover, logical grouping 1002 can include an electrical component for sending interference-overload indications as a function of the monitored reverse link interference to the access terminal served by the disparate base station instigating the access terminal to report an overload condition to the disparate base station to cause the disparate base station to inhibit use of a reserved subset of resources for transmission by the access terminal 1006. Further, logical grouping 1002 can include an electrical component for scheduling at least one disparate, served access terminal to transmit utilizing the reserved subset of resources 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
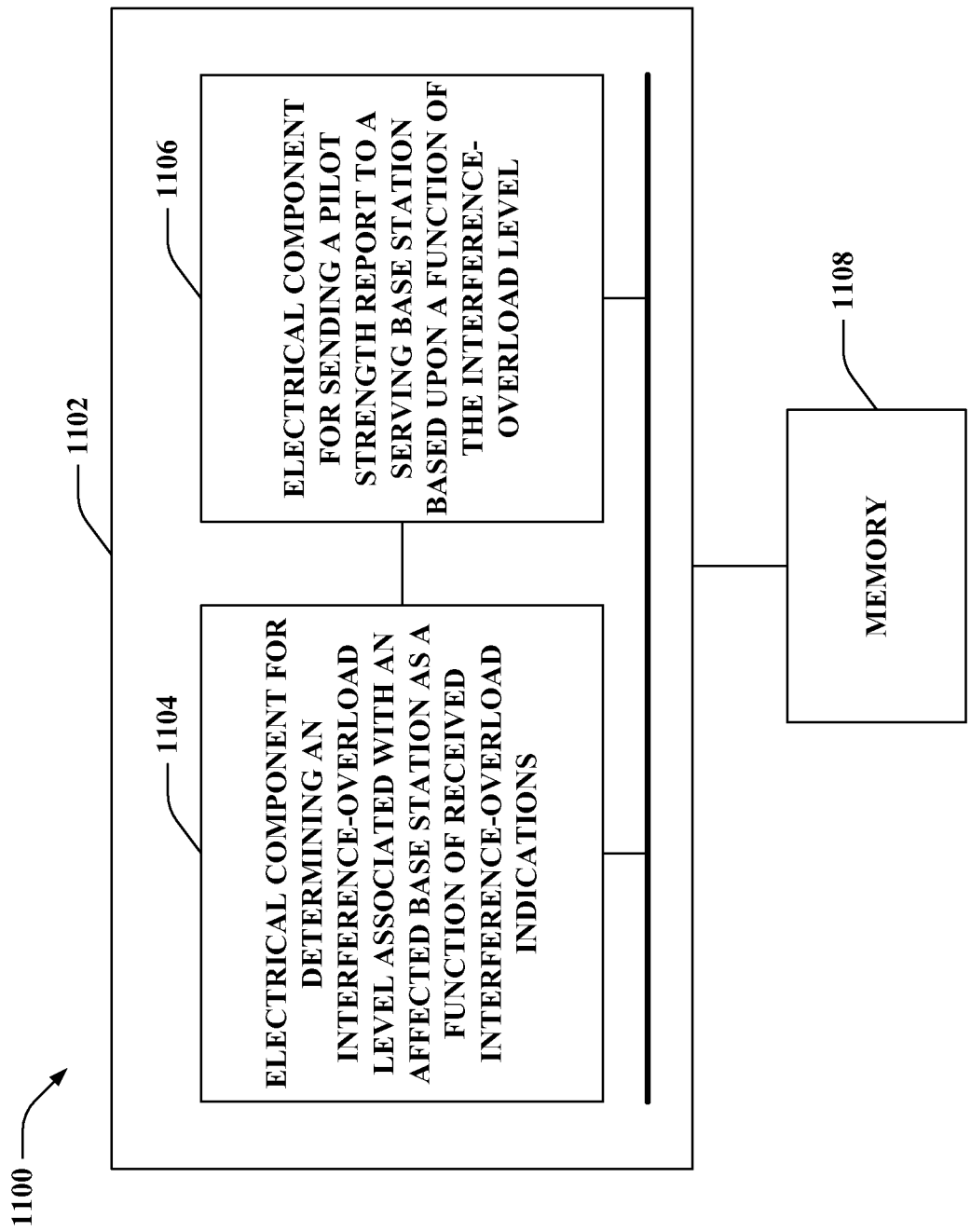
FIG. 11 is an illustration of an example system that enables sending interference induced pilot strength reports in a wireless communication environment.

Turning to FIG. 11, illustrated is a system 1100 that enables sending interference induced pilot strength reports in a wireless communication environment. System 1100 can reside within an access terminal, for instance. As depicted, system 1100 includes functional blocks that can represent functions implemented by a processor, software, or combination thereof (e.g., firmware). System 1100 includes a logical grouping 1102 of electrical components that can act in conjunction. Logical grouping 1102 can include an electrical component for determining an interference-overload level associated with an affected base station as a function of received interference-overload indications 11 04. Moreover, logical grouping 1102 can include an electrical component for sending a pilot strength report to a serving base station based upon a function of the interference-overload level 1106. Additionally, system 1100 can include a memory 1108 that retains instructions for executing functions associated with electrical components 1104 and 1 106. While shown as being external to memory 1108, it is to be understood that electrical components 1104 and 1106 can exist within memory 1108.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for mitigating reverse link interference in a wireless communication environment, comprising:
    monitoring reverse link interference at an affected base station caused by an access terminal served by a disparate base station;
    transmitting interference-overload indications as a function of the monitored reverse link interference to the access terminal served by the disparate base station to trigger the access terminal to report an overload condition to the disparate base station to cause the disparate base station to inhibit use of a reserved subset of resources for transmission by the access terminal in order to mitigate interference to the affected base station;
    scheduling at least one disparate access terminal served by the affected base station to transmit utilizing the reserved subset of resources; and
    explicitly indicating a condition of persistent and severe interference overload to the access terminal by utilizing at least one of a dedicated interference control channel, an embedded bit, and a bit employed for modulation or scrambling.

2. The method of claim 1, wherein the affected base station fails to be included in an active set associated with the access terminal.

3. The method of claim 1, wherein the affected base station is at least one of a pico cell base station, a femto cell base station, and a base station that is part of a private enterprise that denies access to the access terminal.

4. The method of claim 1, wherein the interference-overload indications each comprise one of a reverse activity bit or another sector interference value.

5. The method of claim 1, wherein the reserved subset of resources includes at least one of one or more time slots, one or more interlaces, one or more tones, and certain symbols within particular time slots.

6. The method of claim 1, further comprising receiving a notification identifying resources included in the reserved subset from the disparate base station via a backhaul.

7. The method of claim 1, wherein the resources included in the reserved subset are predefined.

8. The method of claim 1, further comprising receiving a reverse link transmission from the at least one disparate access terminal sent utilizing the reserved subset of resources with decreased reverse link interference.

9. The method of claim 1, wherein the disparate base station excludes the reserved subset of resources for use by the access terminal sent the interference-overload indications and assigns the reserved subset of resources to other non-interfering access terminals.

10. The method of claim 1, wherein the reserved subset of resources includes a particular combination of transmit antennas.

11. A wireless communications apparatus, comprising:
    a memory retaining instructions for
        evaluating a pilot strength report sent from a first access terminal in response to interference-overload indications obtained by the first access terminal from an affected base station, restricting the first access terminal from utilizing a reserved subset of resources for reverse link transmission when the first access terminal is determined from the evaluation of the pilot strength report to interfere with the affected base station above a threshold level, scheduling a second, non-interfering access terminal to employ the reserved subset of resources for reverse link transmission, and explicitly indicating a condition of persistent and severe interference overload to the first access terminal by utilizing at least one of a dedicated interference control channel, an embedded bit, and a bit employed for modulation or scrambling; and a processor coupled to the memory and configured to execute the instructions retained in the memory.

12. The wireless communications apparatus of claim 11, wherein the affected base station is excluded from an active set of the first access terminal.

13. The wireless communications apparatus of claim 11, wherein the memory further retains instructions for recognizing whether the first access terminal causes reverse link interference that exceeds the threshold level at the affected base station based upon the evaluation of the pilot strength report.

14. The wireless communications apparatus of claim 11, wherein the reserved subset of resources includes at least one of one or more time slots, one or more interlaces, one or more tones, and certain symbols within particular time slots.

15. The wireless communications apparatus of claim 11, wherein the resources included in the reserved subset are a function of an amount of interference caused by the first access terminal to the affected base station.

16. The wireless communications apparatus of claim 11, wherein the memory further retains instructions for sending a message to the affected base station via a backhaul informing the affected base station as to the resources included in the reserved subset.

17. The wireless communications apparatus of claim 11, wherein the first access terminal and the second, non-interfering access terminal are served by a common base station.

18. The wireless communications apparatus of claim 11, wherein the reserved subset of resources includes a particular combination of transmit antennas.

19. A wireless communications apparatus that enables mitigating reverse link interference in a wireless communication environment, comprising:

means for monitoring reverse link interference caused by an access terminal served by a disparate base station;

means for sending interference-overload indications as a function of the monitored reverse link interference to the disparate base station triggering the access terminal to report an overload condition to the disparate base station to cause the disparate base station to inhibit use of a reserved subset of resources for transmission by the access terminal;

means for scheduling at least one disparate, served access terminal to transmit utilizing the reserved subset of resources; and means for explicitly indicating a condition of persistent and severe interference overload to the access terminal.

20. The wireless communications apparatus of claim 19, wherein the interference-overload indications each comprise one of a reverse activity bit or another sector interference value.

21. The wireless communications apparatus of claim 19, wherein the reserved subset of resources is parameterized by time, frequency and spatial dimensions.

22. The wireless communications apparatus of claim 19, further comprising means for receiving a message identifying resources included in the reserved subset from the disparate base station via a backhaul.

23. The wireless communications apparatus of claim 19, wherein the resources included in the reserved subset are preset.

24. The wireless communications apparatus of claim 19, further comprising means for receiving a reverse link transmission from the at least one disparate access terminal sent utilizing the reserved subset of resources with decreased reverse link interference.

25. A computer program product, comprising:

a non-transient computer-readable medium, comprising instructions stored thereon that, when executed by a processor, cause the processor to execute a method comprising:

evaluating a pilot strength report sent from a first access terminal in response to interference-overload indications obtained by the first access terminal from an affected base station;

restricting the first access terminal from utilizing a reserved subset of resources for reverse link transmission when the first access terminal is determined from the evaluation of the pilot strength report to interfere with the affected base station above a threshold level;

scheduling a second, non-interfering access terminal to employ the reserved subset of resources for reverse link transmission; and explicitly indicating a condition of persistent and severe interference overload to the first access terminal by utilizing at least one of a dedicated interference control channel, an embedded bit, and a bit employed for modulation or scrambling.

26. The computer program product of claim 25, wherein the affected base station fails to be included in an active set of the first access terminal.

27. The computer program product of claim 25, wherein the method further comprises recognizing whether the first access terminal causes reverse link interference that exceeds the threshold level at the affected base station based upon the evaluation of the pilot strength report.

28. The computer program product of claim 25, wherein the reserved subset of resources includes at least one of one or more time slots, one or more interlaces, one or more tones, certain symbols within particular time slots, and particular combinations of transmit antennas.

29. The computer program product of claim 25, wherein the resources included in the reserved subset are a function of an amount of interference caused by the first access terminal to the affected base station.

30. The computer program product of claim 25, wherein the method further comprises sending a message to the affected base station via a backhaul informing the affected base station as to the resources included in the reserved subset.

31. The computer program product of claim 25, wherein the first access terminal and the second, non-interfering access terminal are served by a common base station.

32. In a wireless communications system, an apparatus comprising:

a processor configured to:

monitor reverse link interference at an affected base station caused by an access terminal served by a disparate base station;

transmit interference-overload indications as a function of the monitored reverse link interference to the access terminal served by the disparate base station to trigger the access terminal to report an overload condition to the disparate base station to cause the disparate base station to inhibit use of a reserved subset of resources for transmission by the access terminal in order to mitigate interference to the affected base station;

schedule at least one disparate access terminal served by the affected base station to transmit utilizing the reserved subset of resources; and explicitly indicating a condition of persistent and severe interference overload to the access terminal by utilizing at least one of a dedicated interference control channel, an embedded bit, and a bit employed for modulation or scrambling.

33. A method for yielding a report in response to interference indications in a wireless communication environment, comprising:

determining an interference-overload level associated with an affected base station based upon interference-overload indications received from the affected base station, wherein the interference-overload indications indicate a condition of persistent and severe interference overload by utilizing at least one of a dedicated interference control channel, an embedded bit, and a bit employed for modulation or scrambling; and transmitting a pilot strength report to a serving base station in response to the received interference-overload indications.

34. The method of claim 33, wherein the affected base station fails to be included in a corresponding active set.

35. The method of claim 33, further comprising monitoring a channel for the interference-overload indications from the affected base station when a forward link signal strength associated with the affected base station is below a level that triggers reporting pilot strength.

36. The method of claim 33, further comprising identifying the interference-overload level to be at a high level when interference-overload indications are received from the affected base station during at least M out of N transmission opportunities, where M and N are integers and M is less than or equal to N.

37. The method of claim 33, wherein the report is an interference overload report.

38. The method of claim 33, wherein the report is a pilot strength report.

39. The method of claim 38, further comprising incorporating an indication of severity of interference being caused to the affected base station in the pilot strength report.

40. The method of claim 38, further comprising inserting information related to a spatial channel between the affected base station and a transmitting access terminal in the pilot strength report.

41. The method of claim 33, further comprising receiving an indication from the serving base station inhibiting use of a reserved subset of resources for reverse link transmission in response to the transmitted report.

42. The method of claim 41, wherein the reserved subset of resources includes at least one of one or more time slots, one or more interlaces, one or more tones, and certain symbols within particular time slots.

43. The method of claim 41, wherein the reserved subset of resources includes a particular combination of transmit antennas.

44. A wireless communications apparatus, comprising:
a memory retaining instructions for
determining an interference-overload level associated with an affected base station based upon received interference-overload indications,
wherein the interference-overload indications indicate a condition of persistent and severe interference overload by utilizing at least one of a dedicated interference control channel, an embedded bit, and a bit employed for modulation or scrambling, and
transmitting a pilot strength report to a serving base station in response to the received interference-overload indications; and
a processor coupled to the memory and configured to execute the instructions retained in the memory.

45. The wireless communications apparatus of claim 44, wherein the affected base station fails to be included in a corresponding active set.

46. The wireless communications apparatus of claim 44, wherein the memory further retains instruction for monitoring a channel for the interference-overload indications from the affected base station when a forward link signal strength associated with the affected base station is below a level that triggers reporting pilot strength.

47. The wireless communications apparatus of claim 44, wherein the memory further retains instruction for identifying the interference-overload level to be at a high level when interference-overload indications are received from the affected base station during at least M out of N transmission opportunities, where M and N are integers and M is less than or equal to N.

48. The wireless communications apparatus of claim 44, wherein the memory further retains instruction for incorporating an indication of severity of interference being caused to the affected base station in the pilot strength report.

49. The wireless communications apparatus of claim 44, wherein the memory further retains instruction for inserting information related to a spatial channel between the affected base station and a transmitting access terminal in the pilot strength report.

50. The wireless communications apparatus of claim 44, wherein the memory further retains instruction for receiving an indication from the serving base station inhibiting use of a reserved subset of resources for reverse link transmission in response to the transmitted pilot strength report.

51. The wireless communications apparatus of claim 50, wherein the reserved subset of resources includes at least one of one or more time slots, one or more interlaces, one or more tones, certain symbols within particular time slots, and particular combinations of transmit antennas.

52. A wireless communications apparatus that enables sending interference induced pilot strength reports in a wireless communication environment, comprising:
means for determining an interference-overload level associated with an affected base station as a function of received interference-overload indications,
wherein the interference-overload indications indicate a condition of persistent and severe interference overload by utilizing at least one of a dedicated interference control channel, an embedded bit, and a bit employed for modulation or scrambling; and
means for sending a pilot strength report to a severing base station in response to the received interference-overload indications.

53. The wireless communications apparatus of claim 52, further comprising means for monitoring a channel for the interference-overload indications from the affected base station when a forward link signal strength associated with the affected base station is below a level that triggers reporting pilot strength.

54. The wireless communications apparatus of claim 52, further comprising means for identifying the interference-overload level to be at a high level when interference-overload indications are received from the affected base station during at least M out of N transmission opportunities, where M and N are integers and M is less than or equal to N.

55. The wireless communications apparatus of claim 52, further comprising means for incorporating an indication of severity of interference being caused to the affected base station in the pilot strength report.

56. The wireless communications apparatus of claim 52, further comprising means for inserting information related to a spatial channel between the affected base station and a transmitting access terminal in the pilot strength report.

57. The wireless communications apparatus of claim 52, further comprising means for receiving an indication from the serving base station inhibiting use of a reserved subset of resources for reverse link transmission in response to the transmitted pilot strength report, wherein the reserved subset of resources includes at least one of one or more time slots, one or more interlaces, one or more tones, certain symbols within particular time slots, and particular combinations of transmit antennas.

58. A computer program product, comprising:
   a non-transient computer-readable medium, comprising instructions stored thereon that, when executed by a processor, cause the processor to execute a method comprising:
      determining an interference-overload level associated with an affected base station based upon received interference-overload indications,
      wherein the interference-overload indications indicate a condition of persistent and severe interference overload by utilizing at least one of a dedicated interference control channel, an embedded bit, and a bit employed for modulation or scrambling; and
      transmitting a pilot strength report to a serving base station in response to the received interference-overload indications.

59. The computer program product of claim 58, wherein the affected base station fails to be included in a corresponding active set.

60. The computer program product of claim 58, wherein the method further comprises monitoring a channel for the interference-overload indications from the affected base station when a forward link signal strength associated with the affected base station is below a level that triggers reporting pilot strength.

61. The computer program product of claim 58, wherein the method further comprises identifying the interference-overload level to be at a high level when interference-overload indications are received from the affected base station during at least M out of N transmission opportunities, where M and N are integers and M is less than or equal to N.

62. The computer program product of claim 58, wherein the method further comprises incorporating an indication of severity of interference being caused to the affected base station in the pilot strength report.

63. The computer program product of claim 58, wherein the method further comprises inserting information related to a spatial channel between the affected base station and a transmitting access terminal in the pilot strength report.

64. The computer program product of claim 58, wherein the method further comprises receiving an indication from the serving base station inhibiting use of a reserved subset of resources for reverse link transmission in response to the transmitted pilot strength report, wherein the reserved subset of resources includes at least one of one or more time slots, one or more interlaces, one or more tones, certain symbols within particular time slots, and particular combinations of transmit antennas.

65. In a wireless communications system, an apparatus comprising:
   a processor configured to:
      determine an interference-overload level associated with an affected base station based upon received interference-overload indications,
      wherein the interference-overload indications indicate a condition of persistent and severe interference overload by utilizing at least one of a dedicated interference control channel, an embedded bit, and a bit employed for modulation or scrambling; and
      transmit a pilot strength report to a serving base station in response to the received interference-overload indications.

\* \* \* \* \*